T. CARROLL.
CASH REGISTER.
APPLICATION FILED JUNE 10, 1909.
1,108,968.
Patented Sept. 1, 1914.
22 SHEETS—SHEET 1.
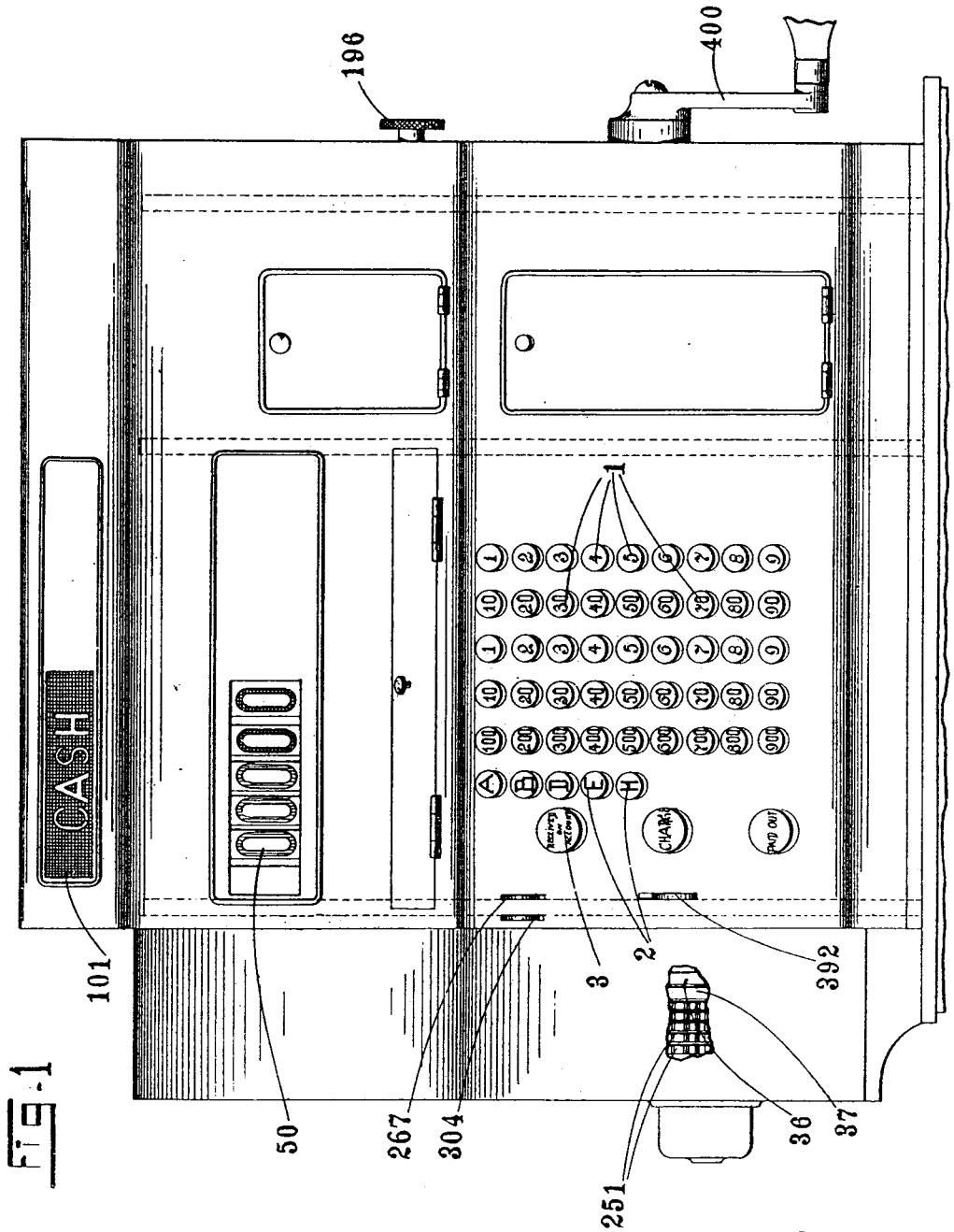

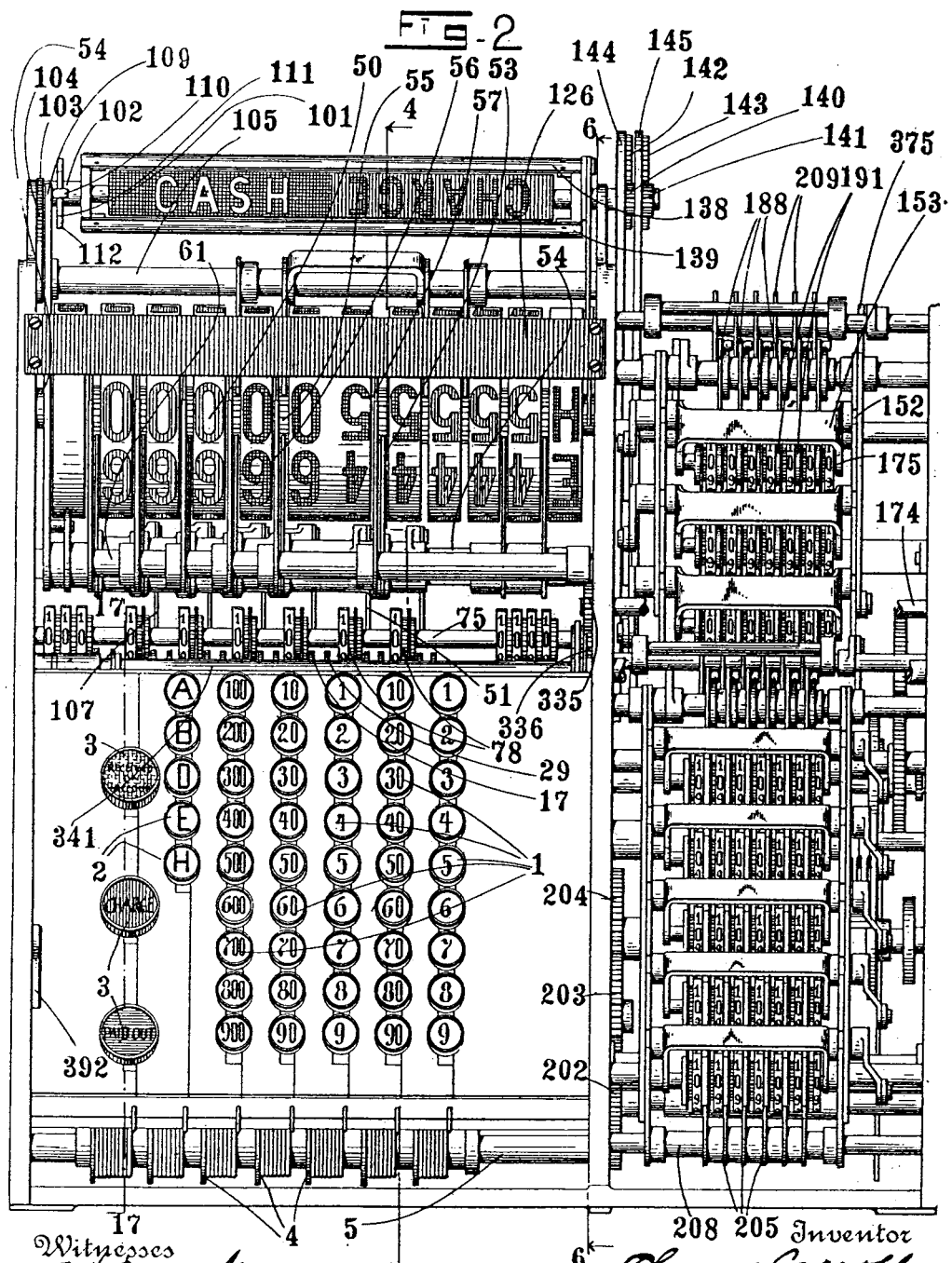

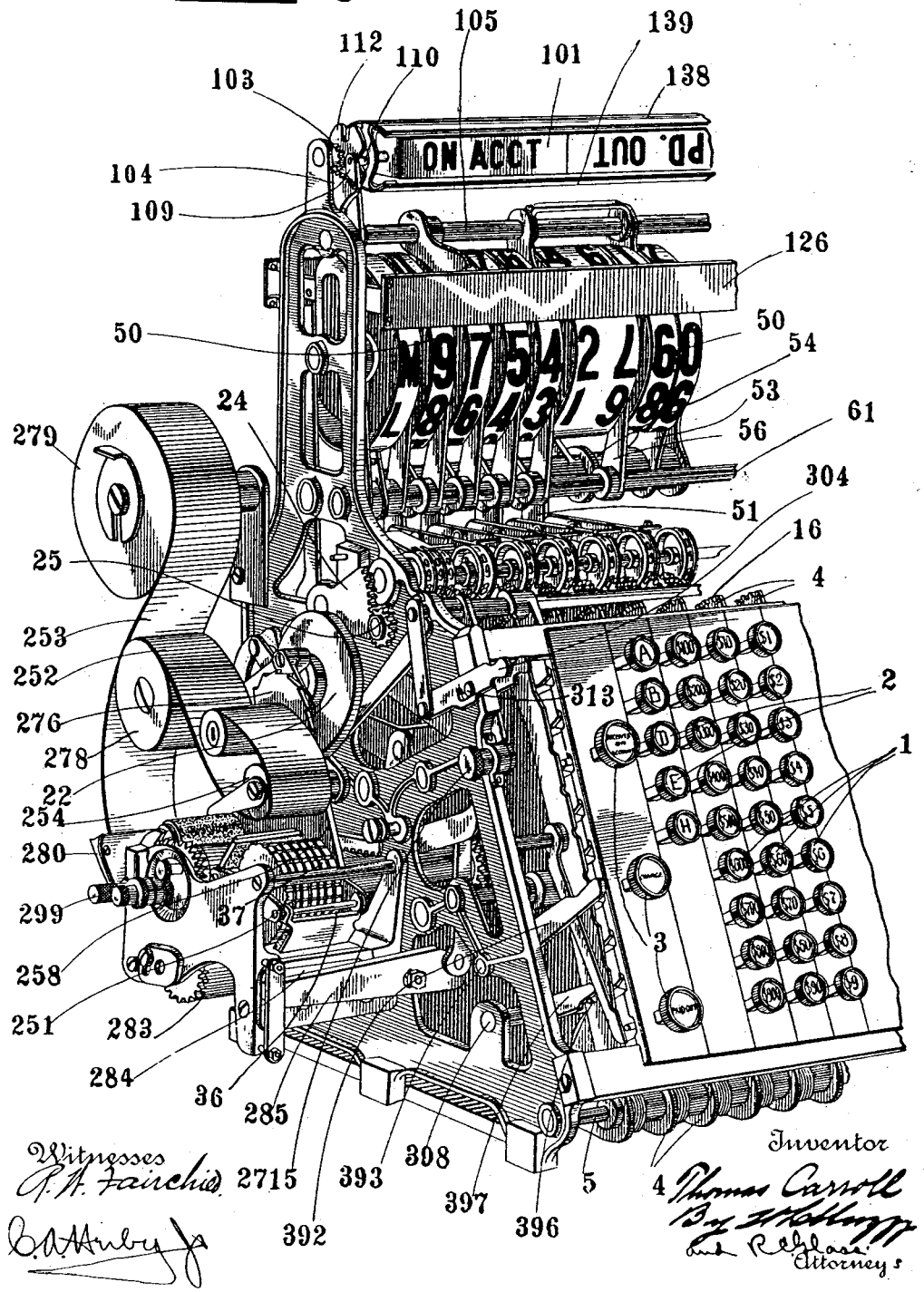

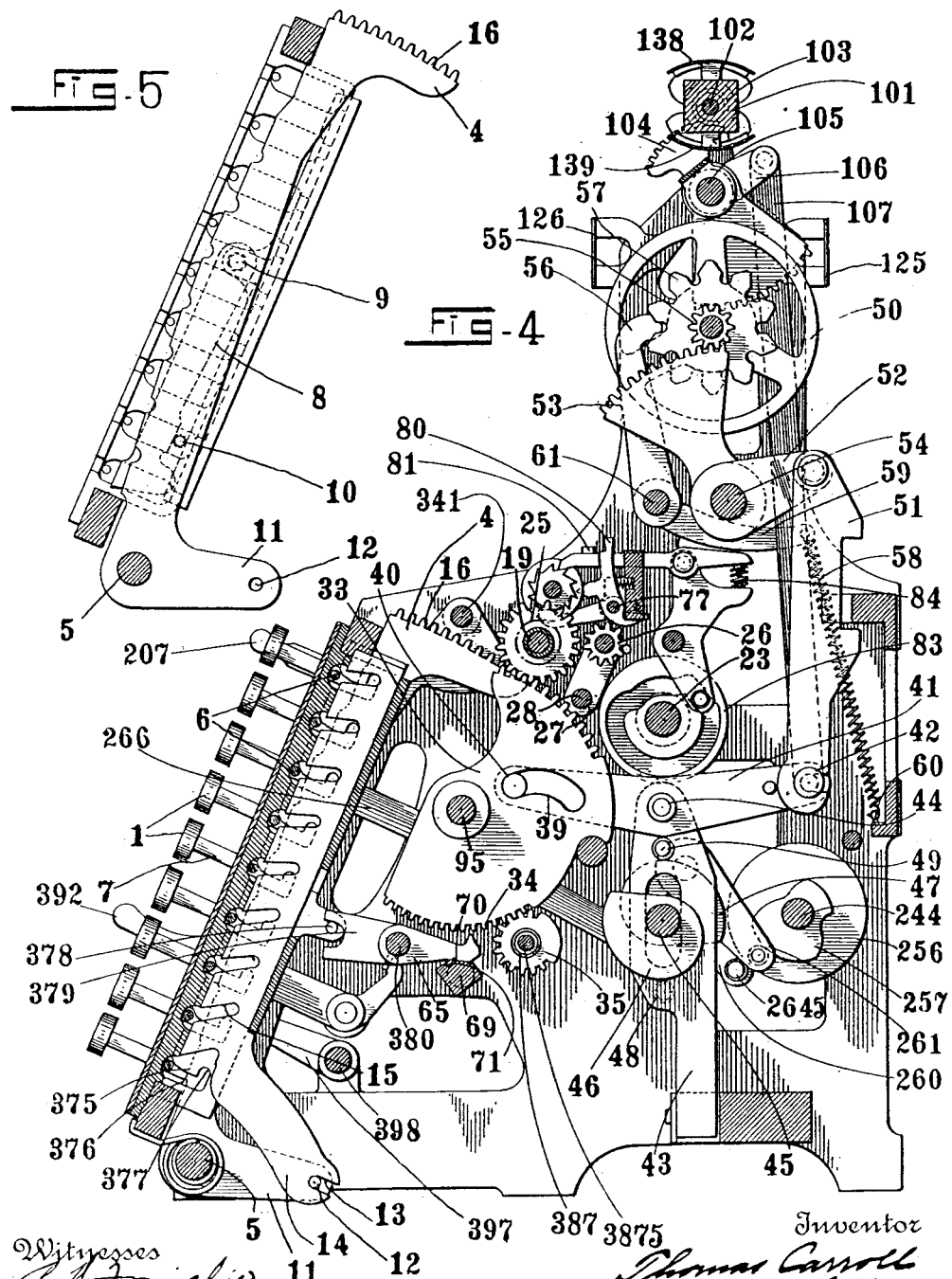

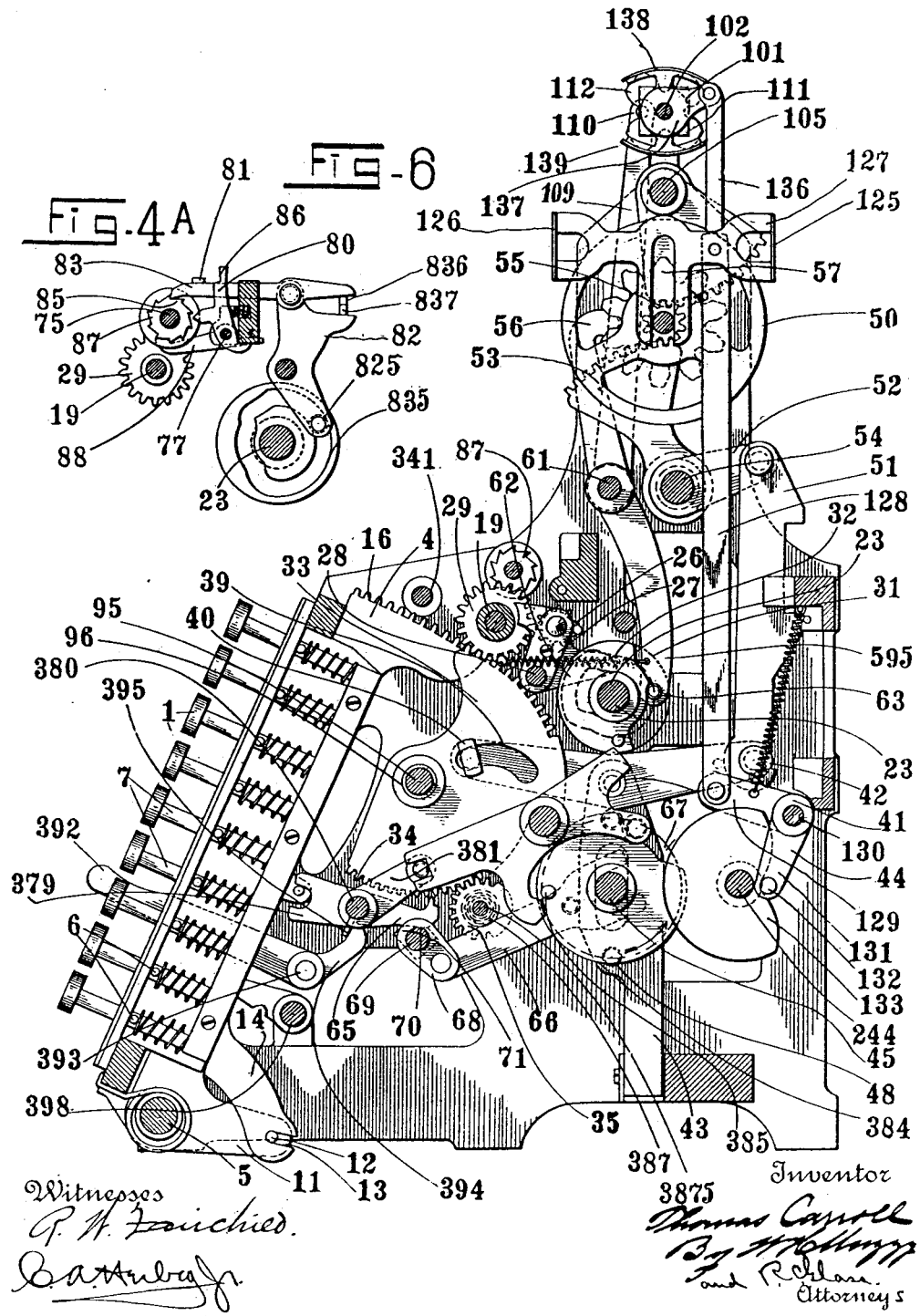

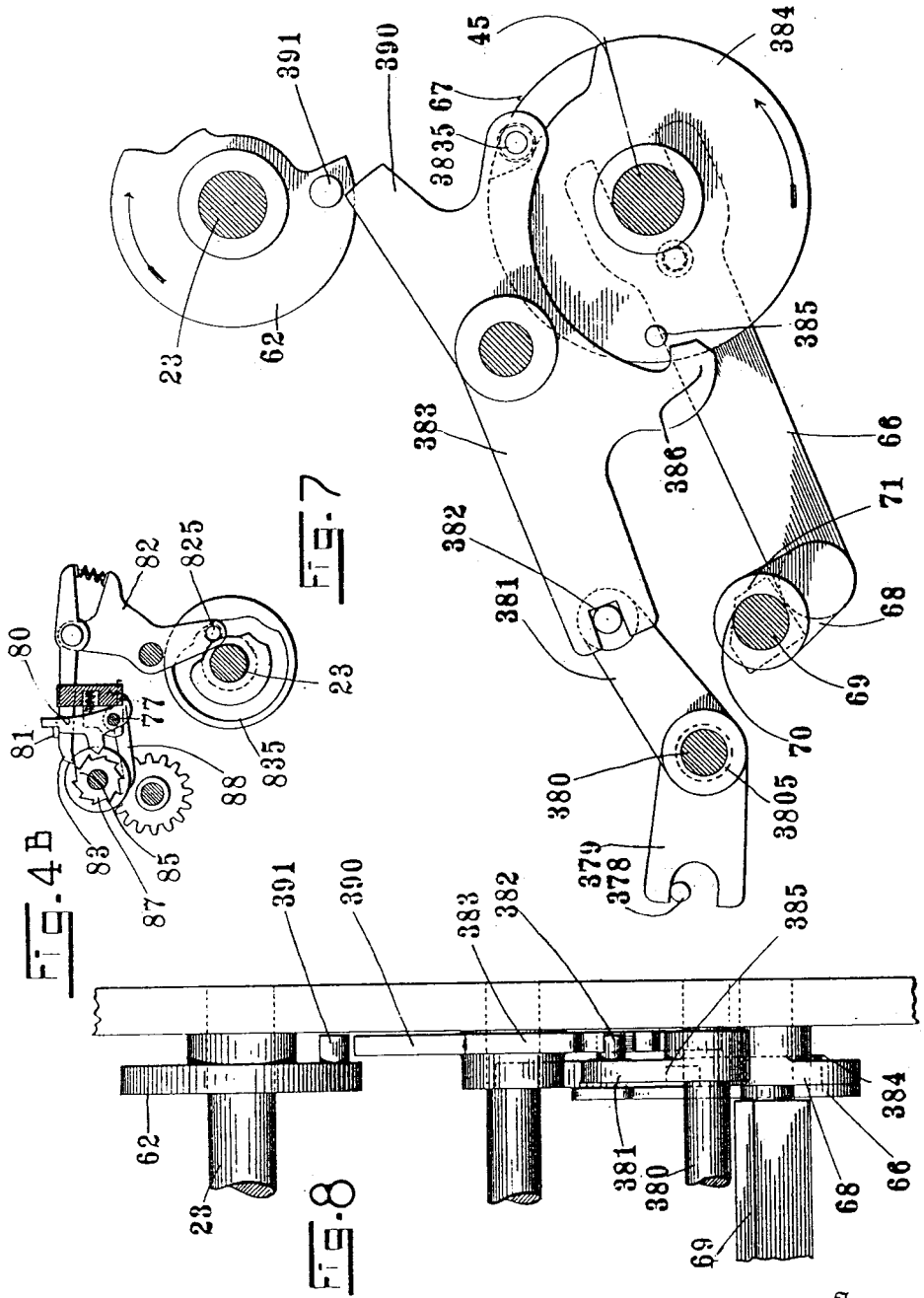

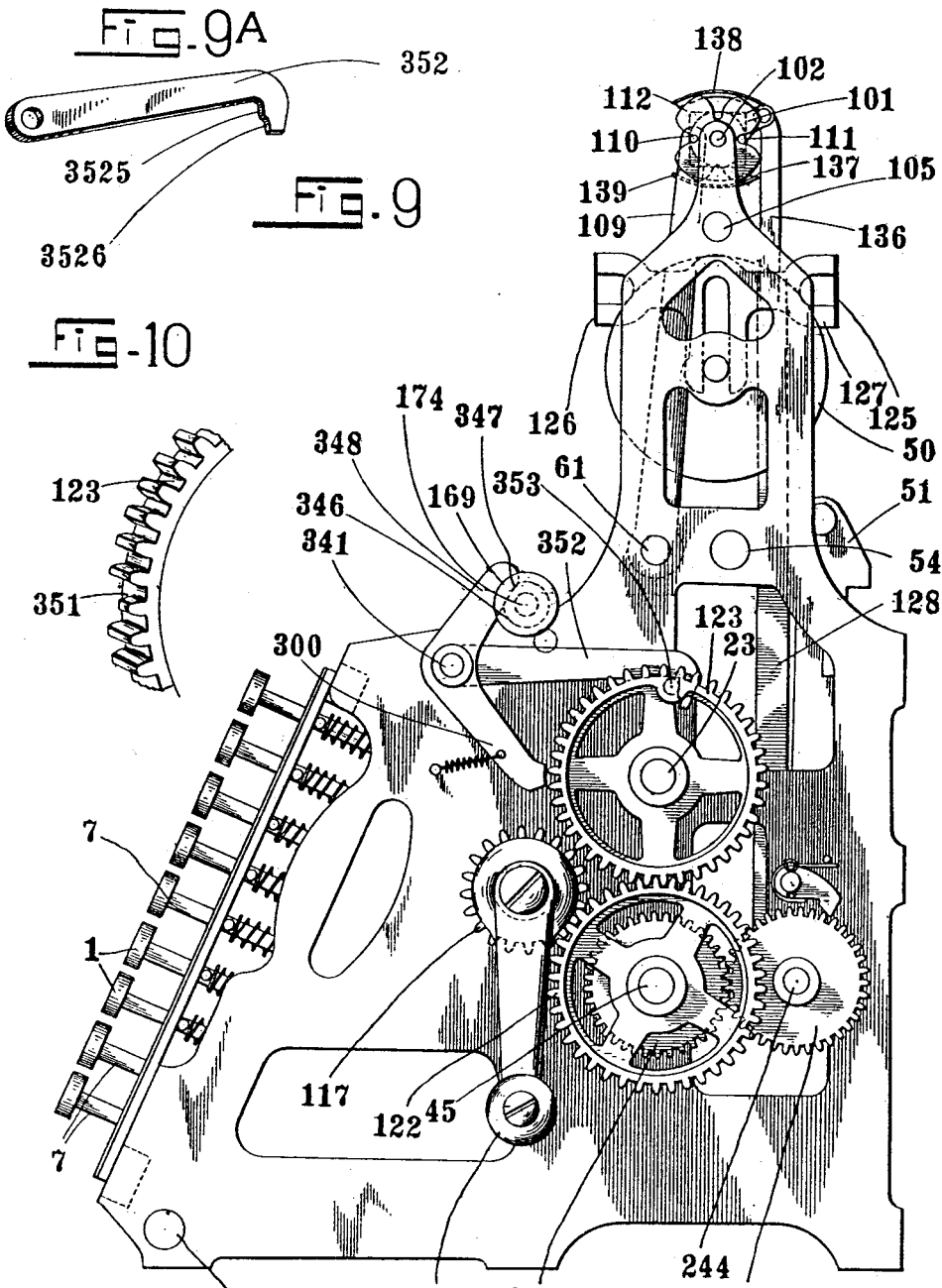

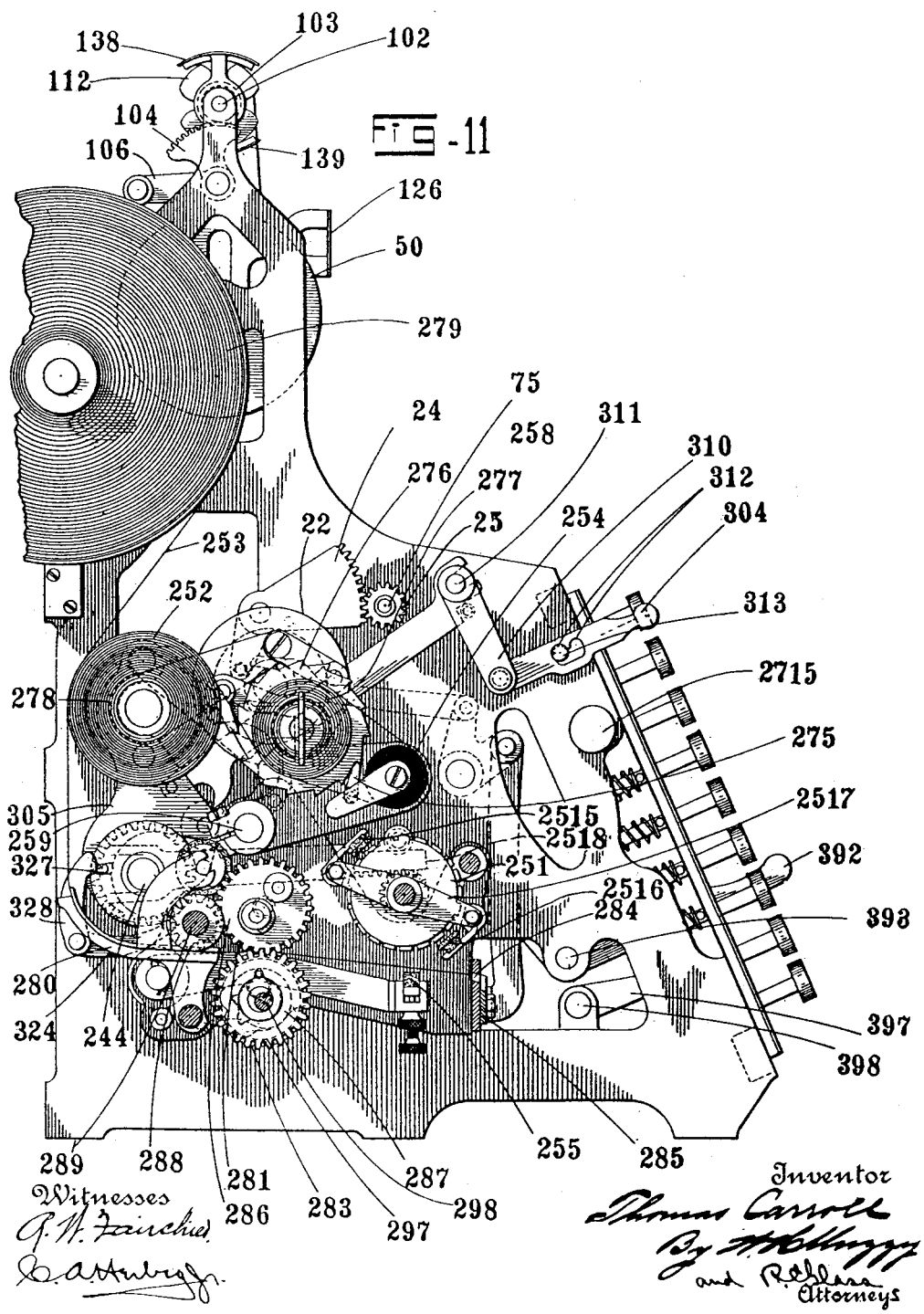

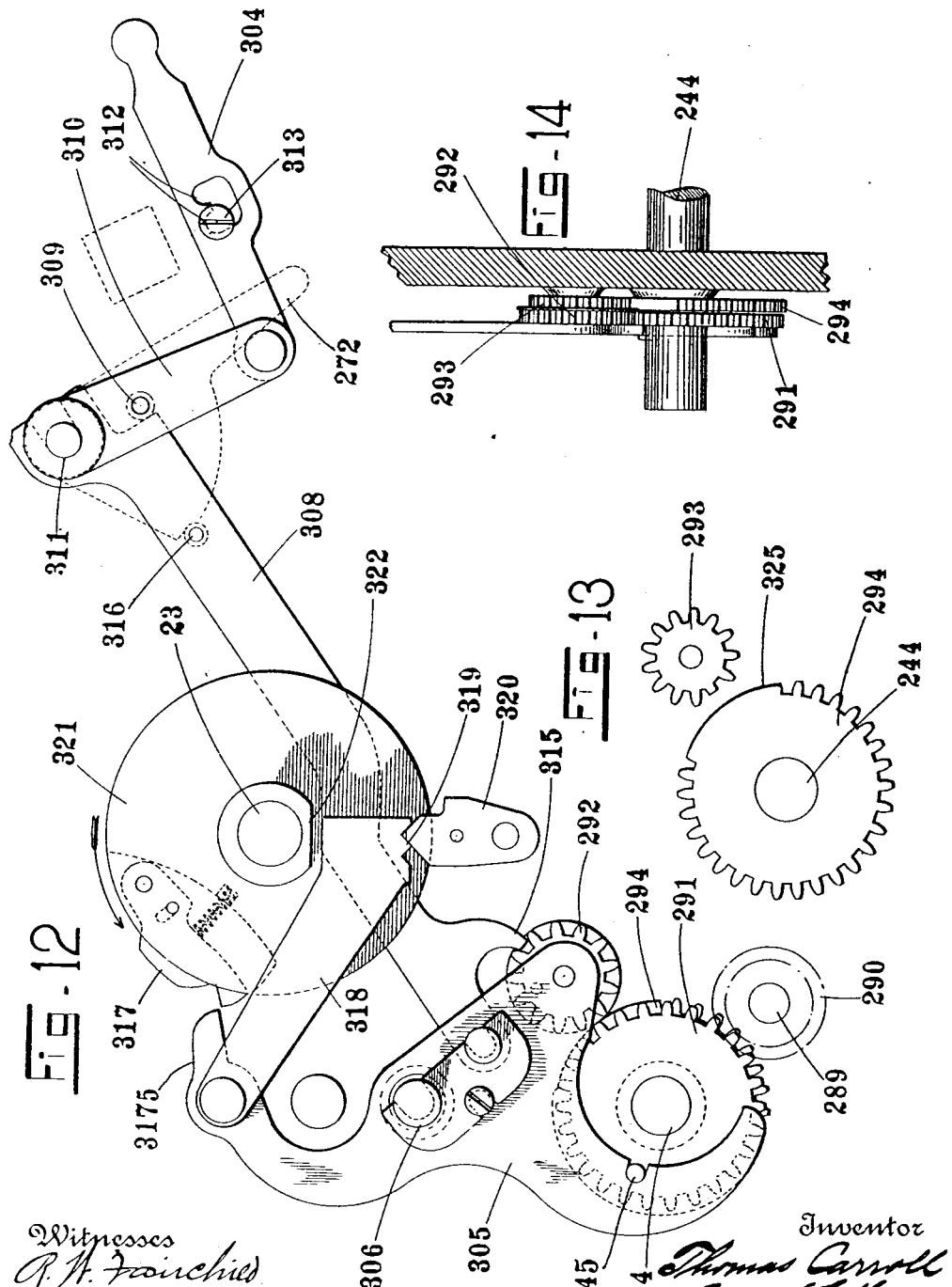

T. CARROLL.
CASH REGISTER.
APPLICATION FILED JUNE 10, 1909.
1,108,968.
Patented Sept. 1, 1914.
22 SHEETS—SHEET 10.
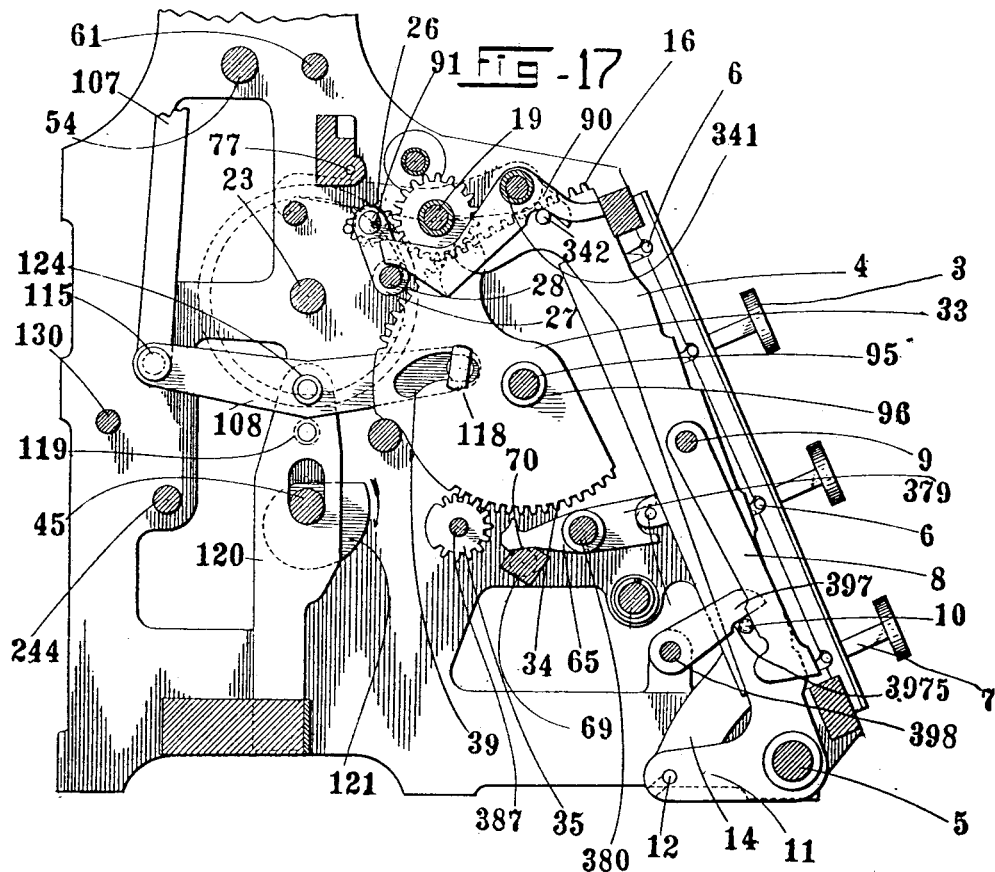
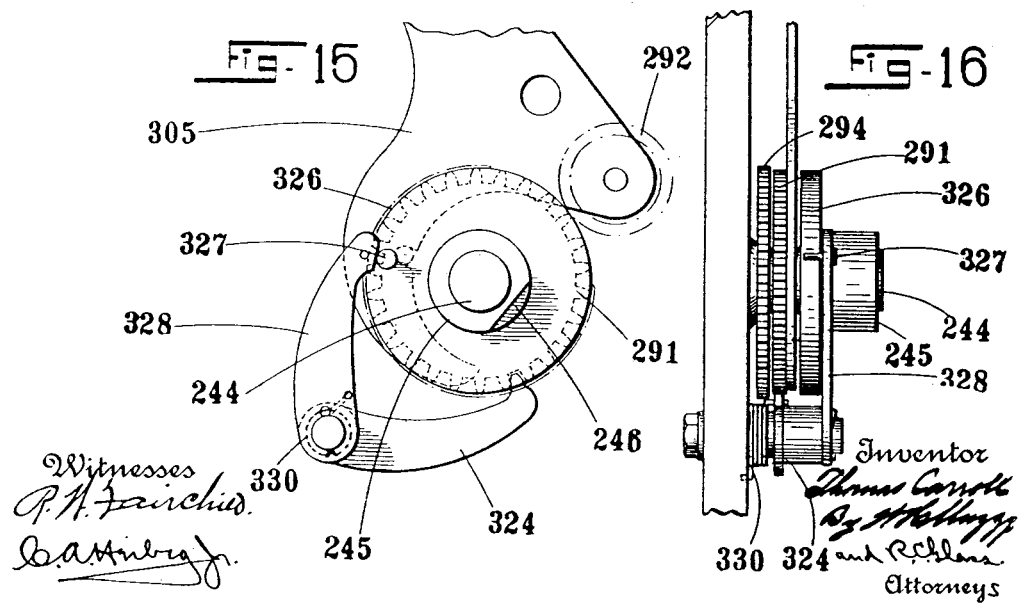

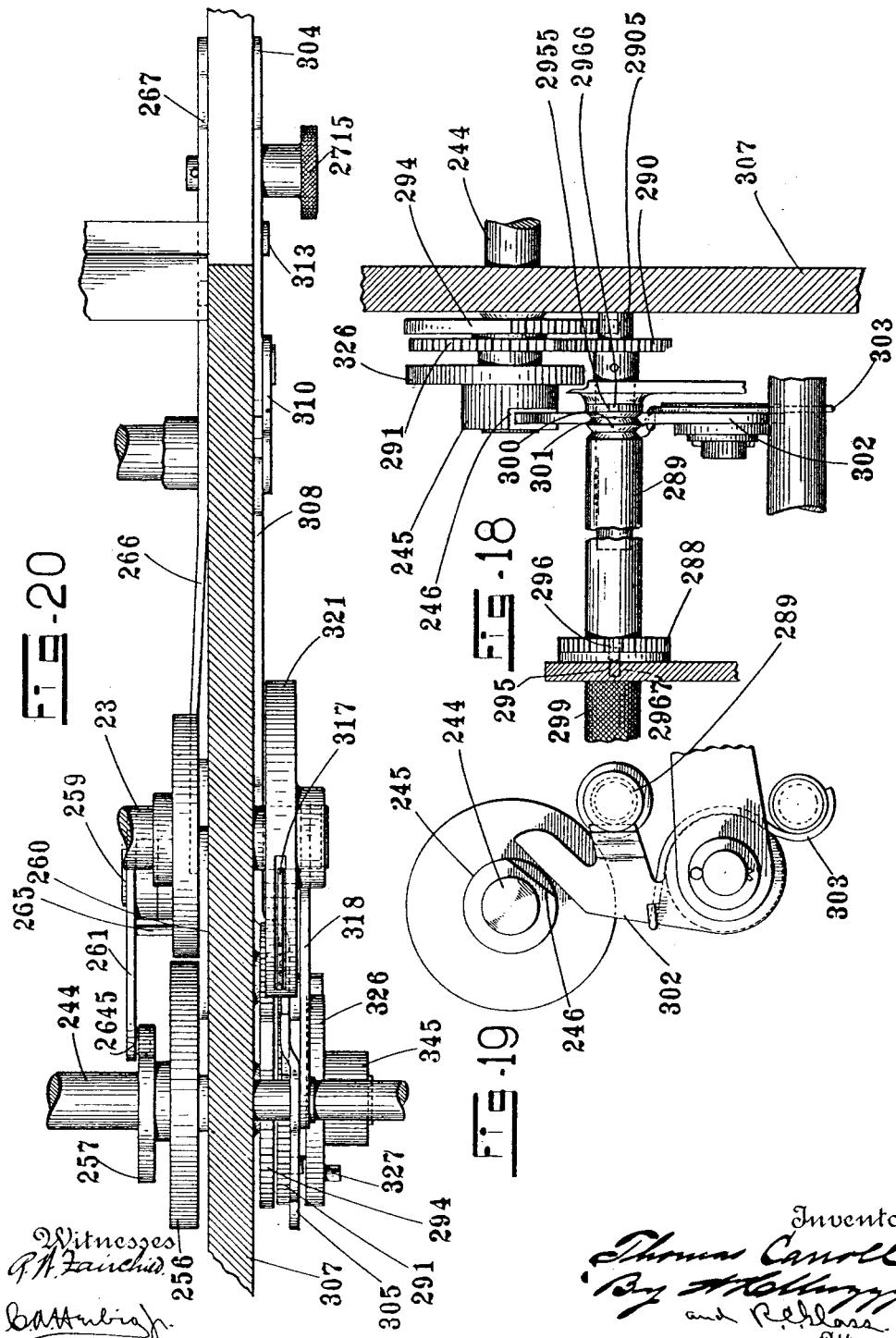

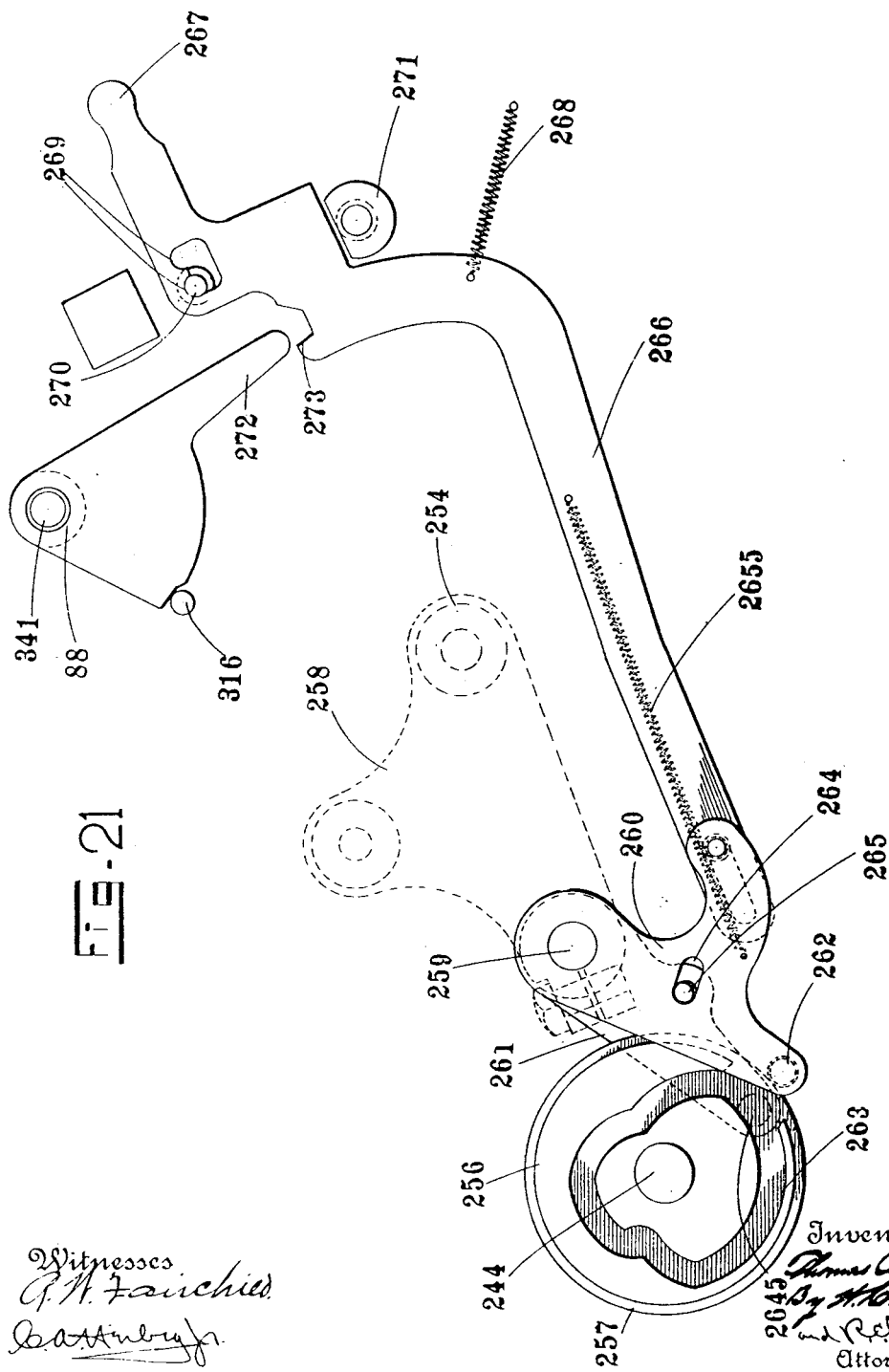

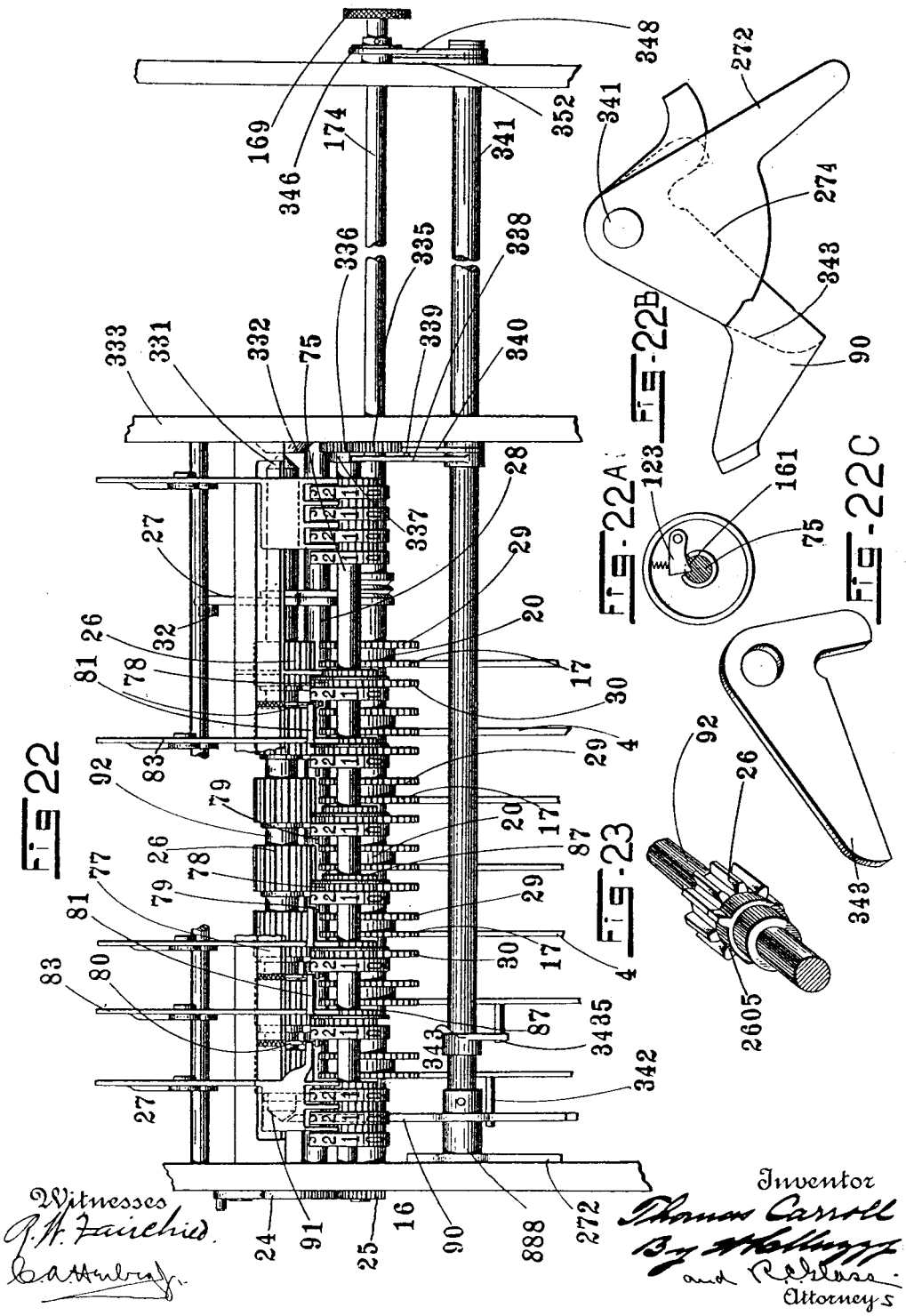

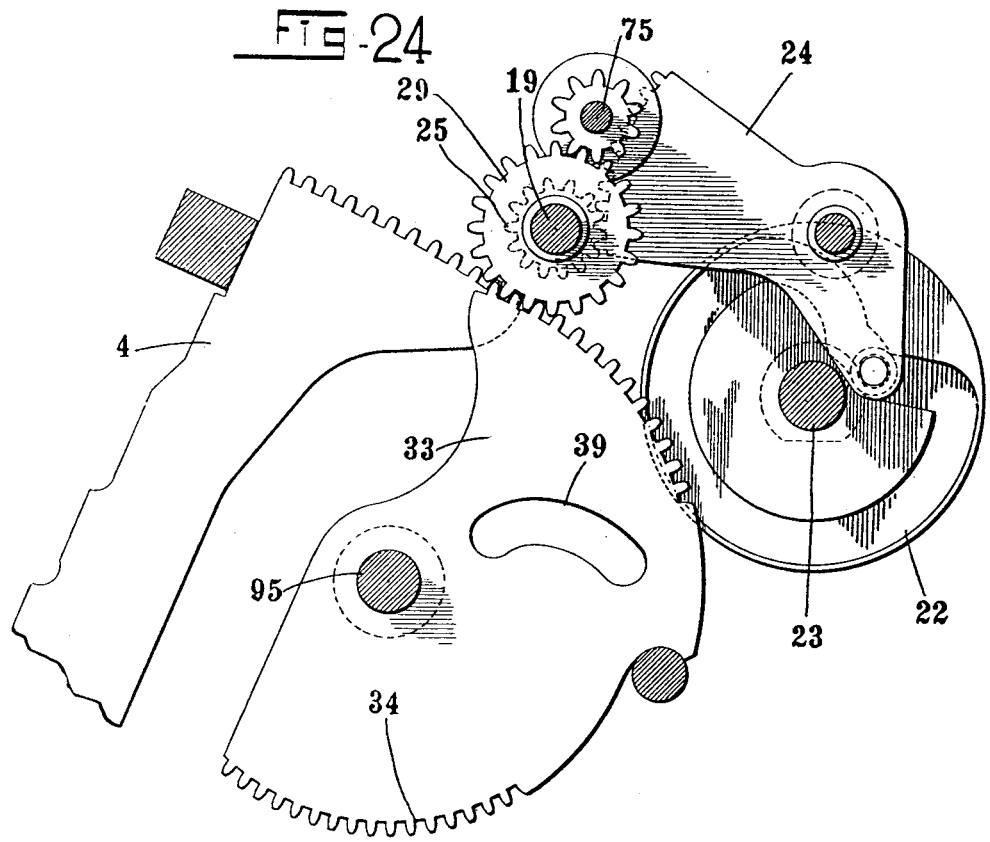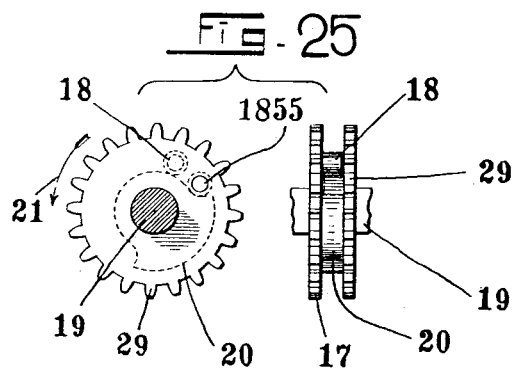

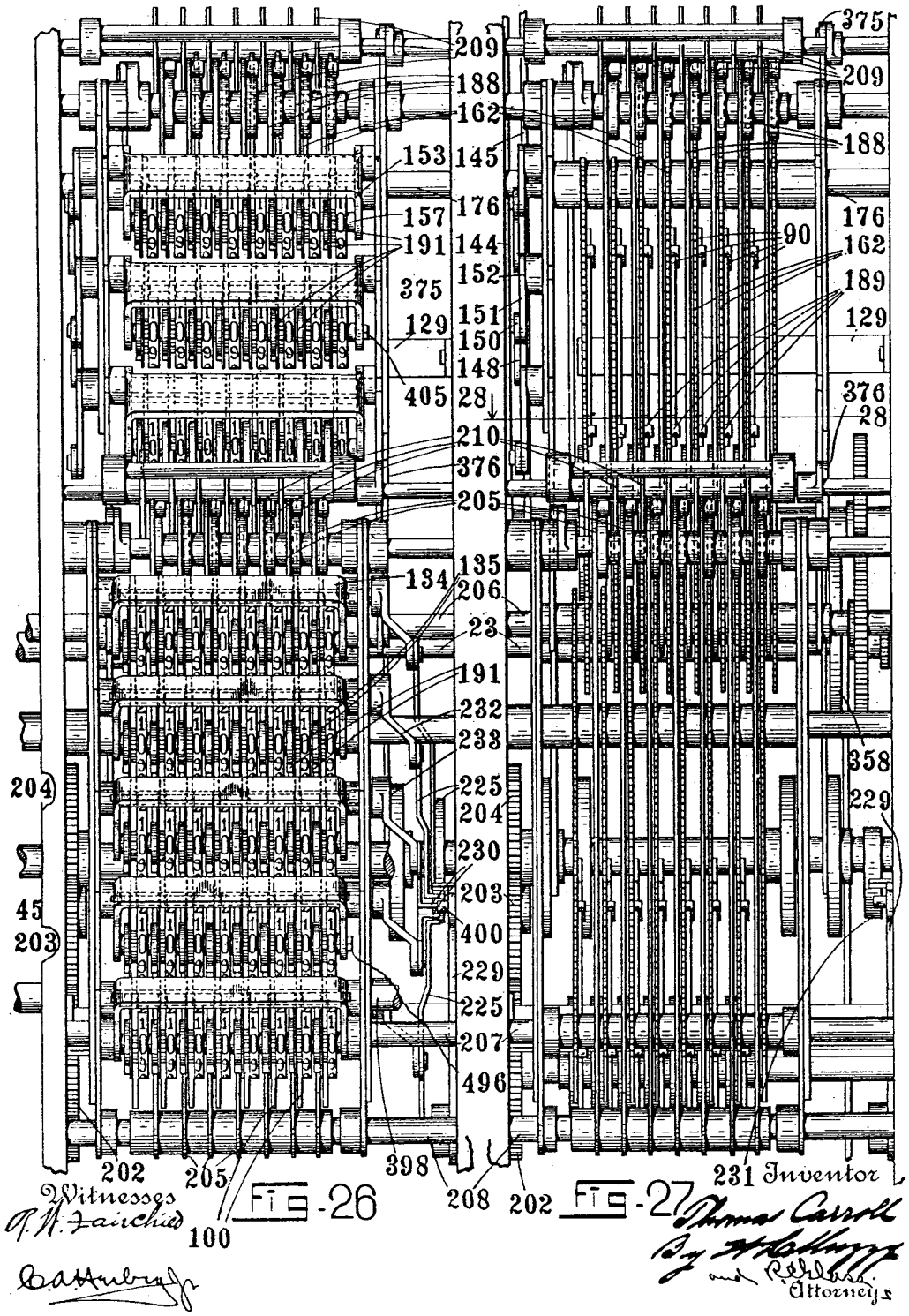

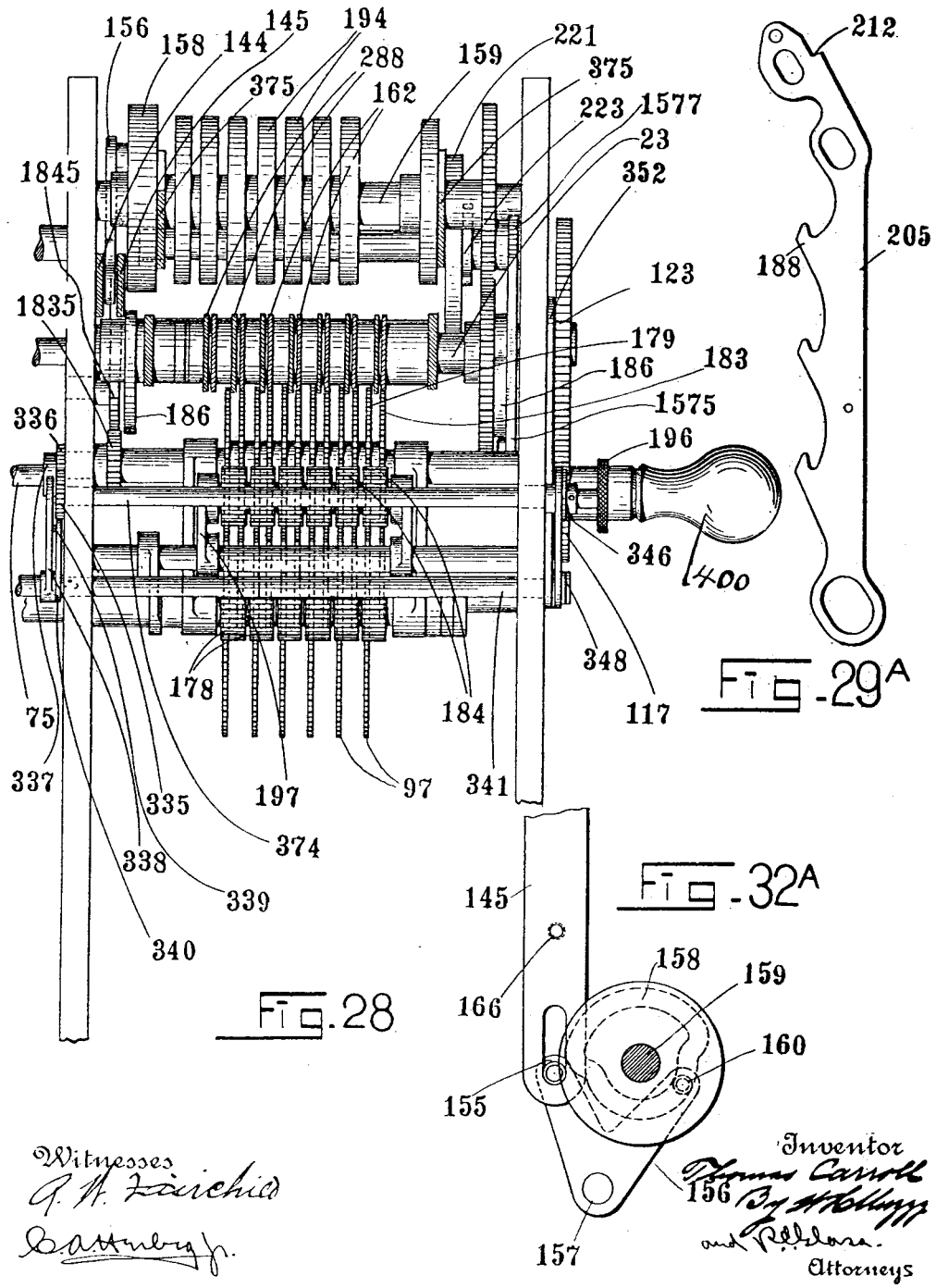

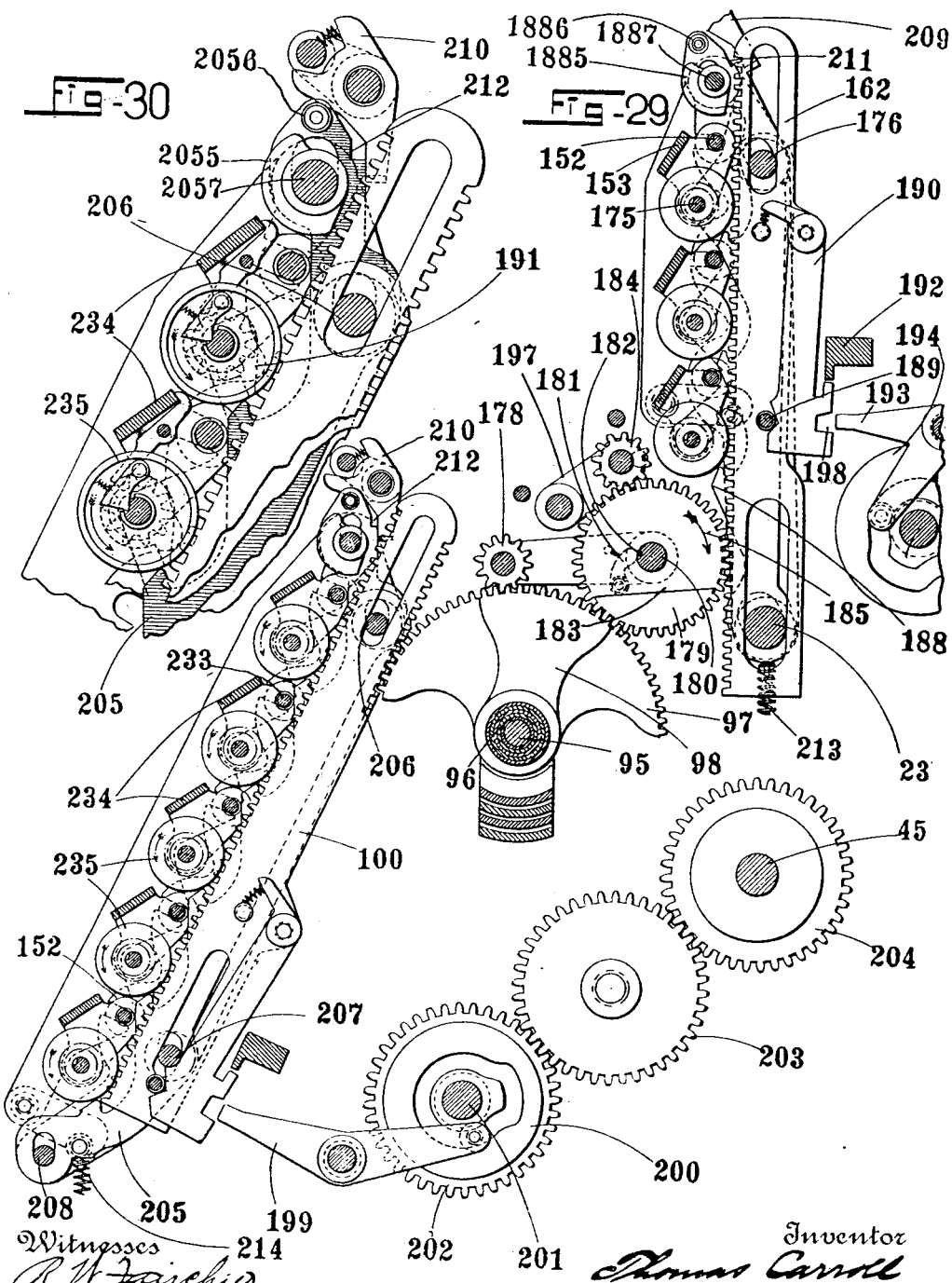

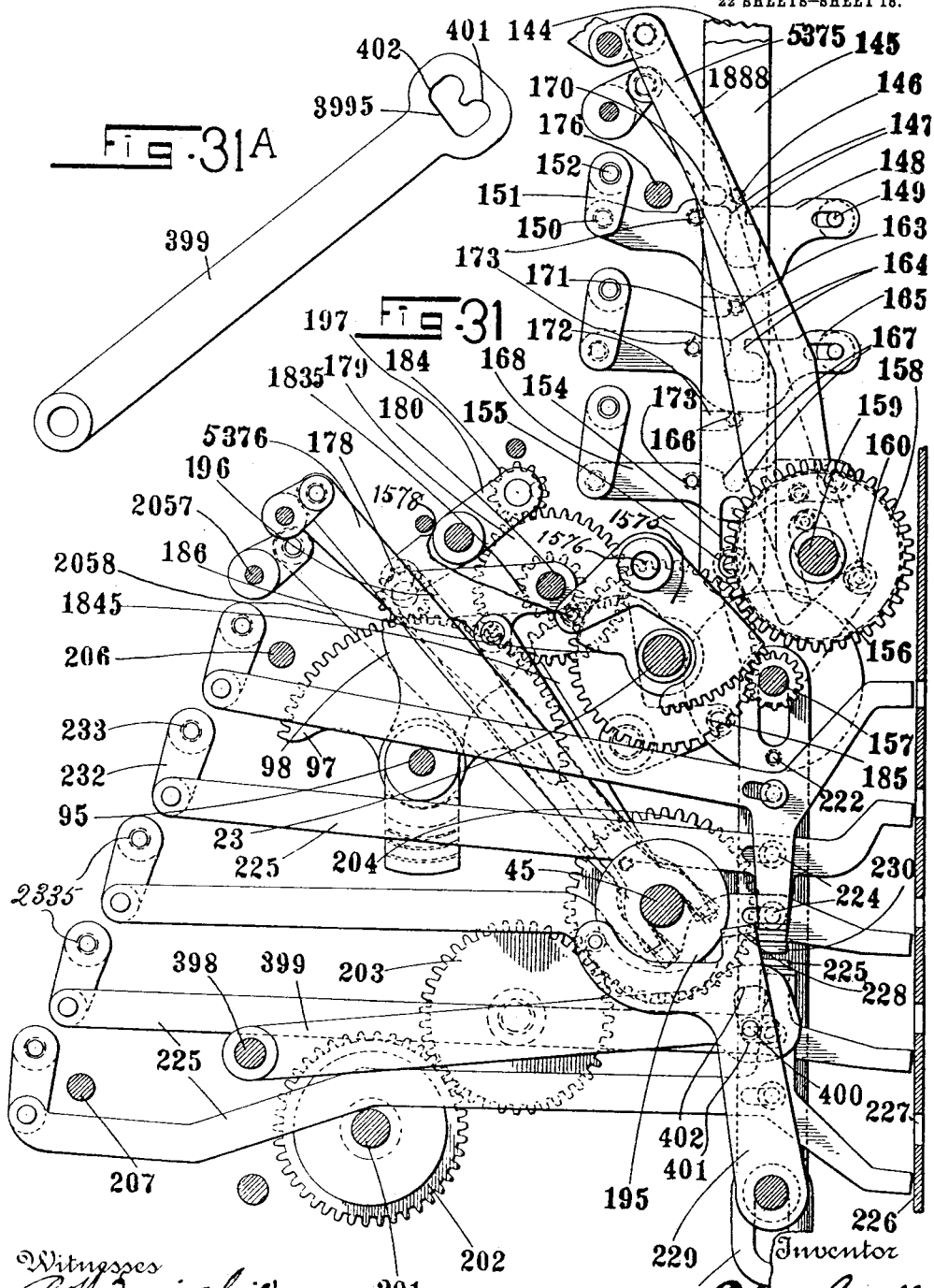

T. CARROLL.
CASH REGISTER.
APPLICATION FILED JUNE 10, 1909.
1,108,968.
Patented Sept. 1, 1914.
22 SHEETS—SHEET 19.
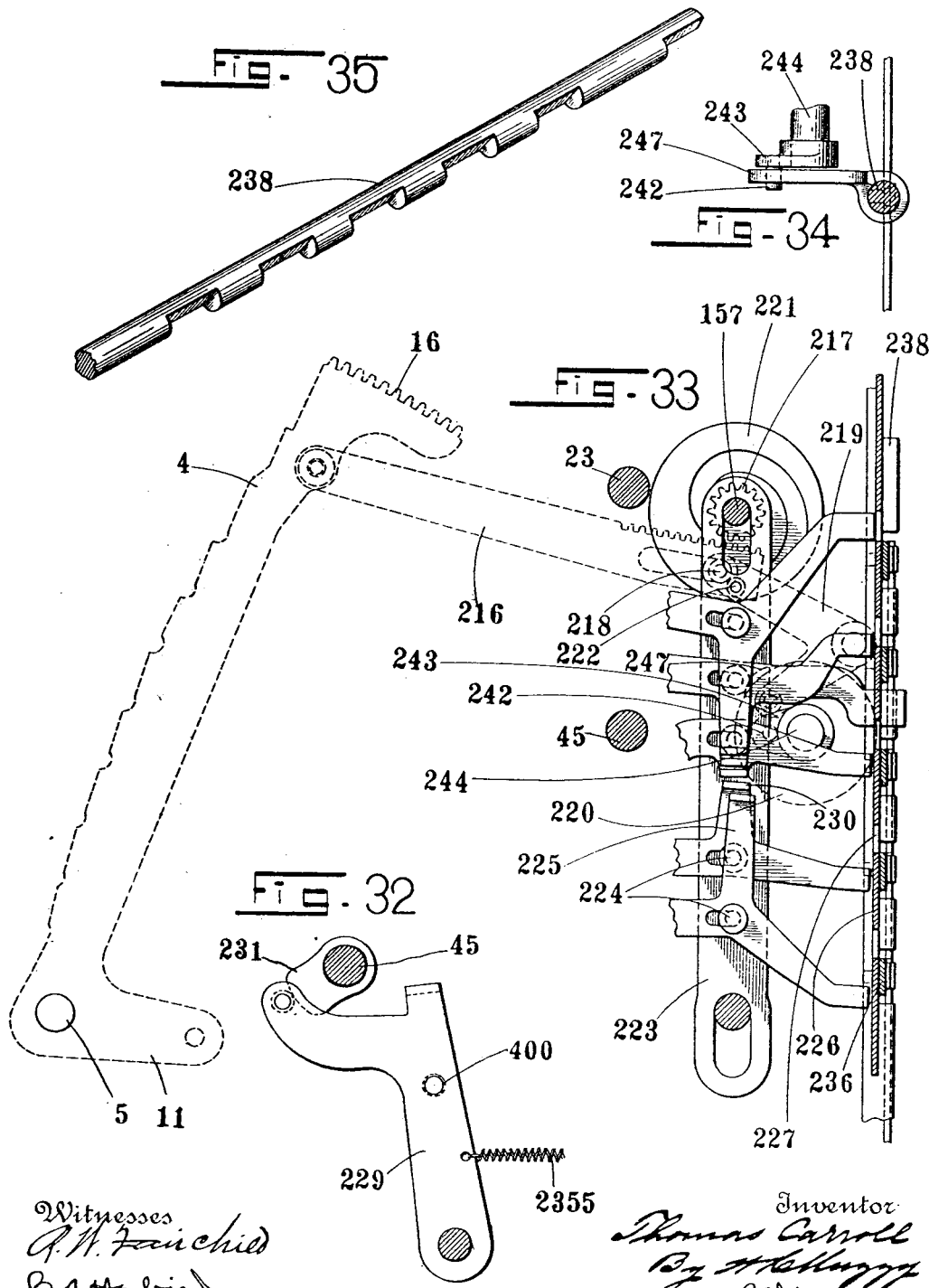

T. CARROLL.
CASH REGISTER.
APPLICATION FILED JUNE 10, 1909.
1,108,968.
Patented Sept. 1, 1914.
22 SHEETS—SHEET 20.
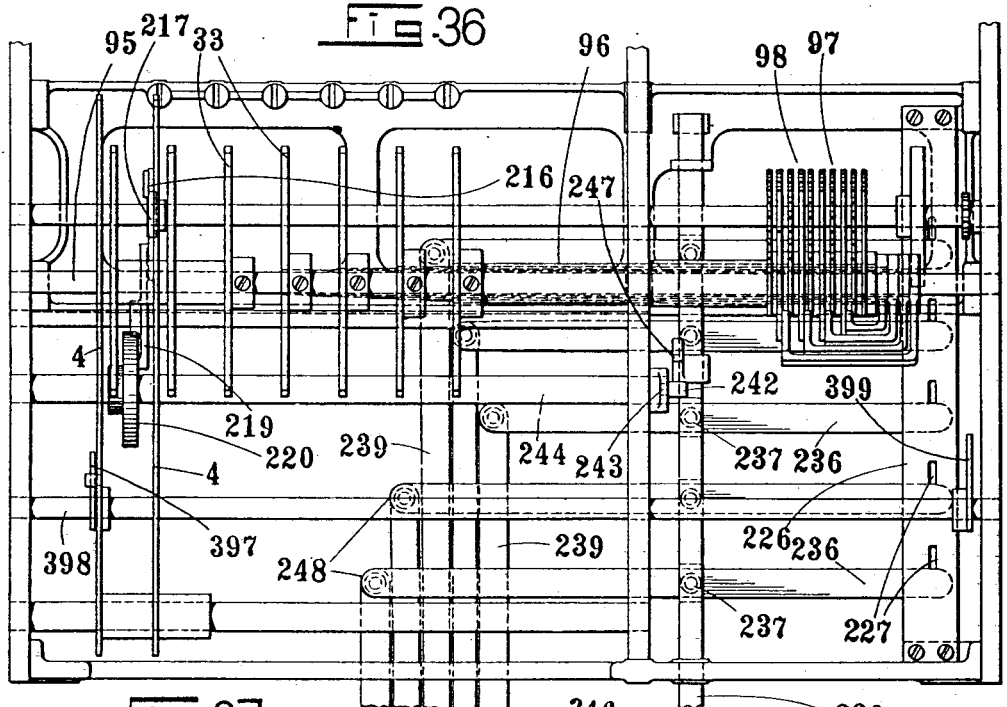
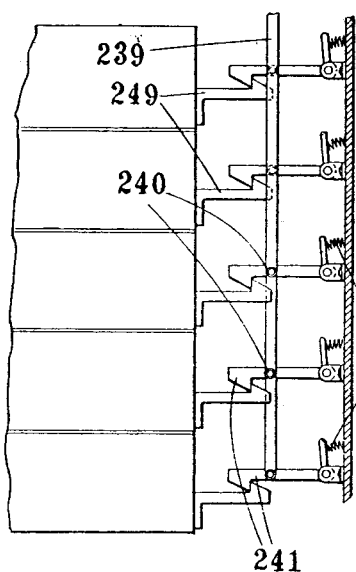
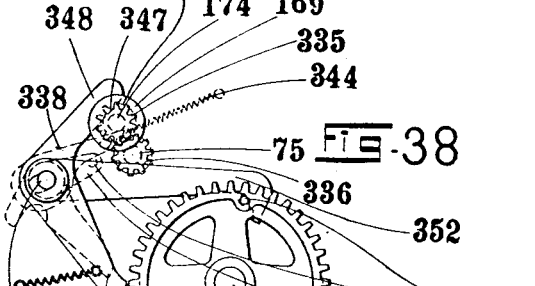
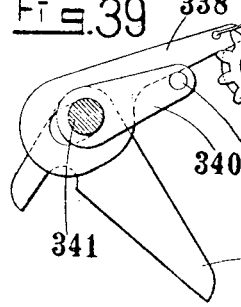

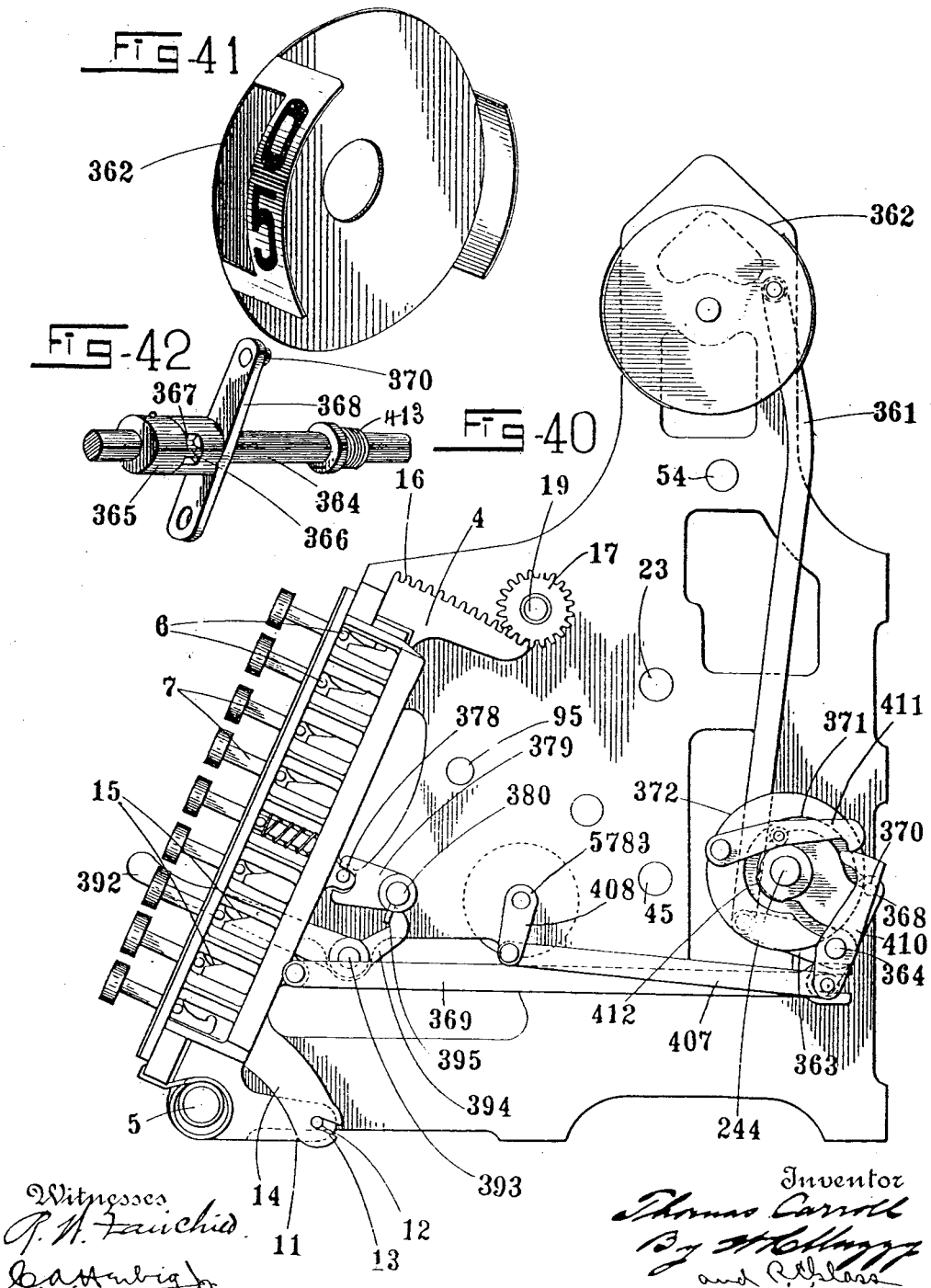

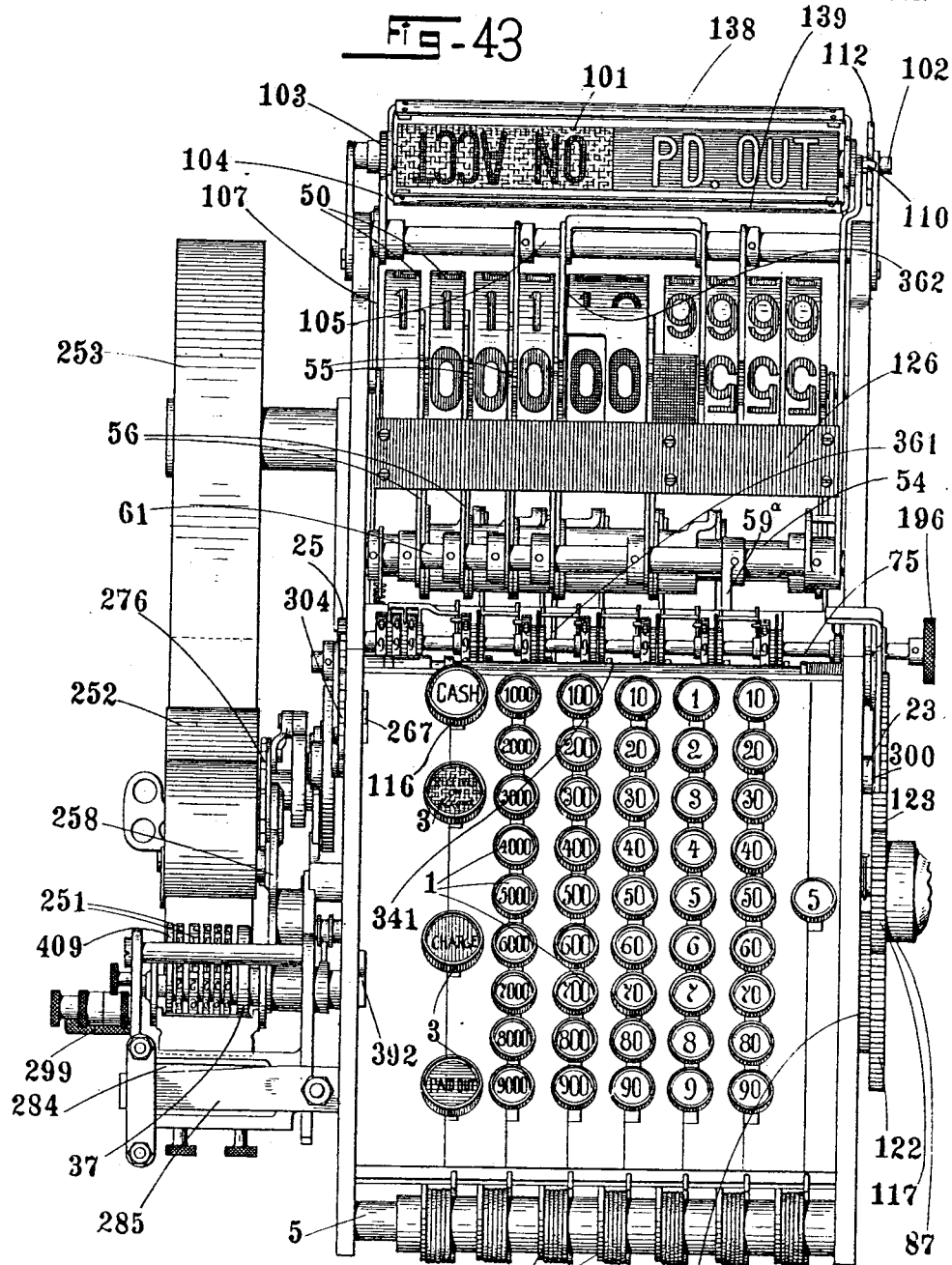

UNITED STATES PATENT OFFICE.

THOMAS CARROLL, OF OAKWOOD, OHIO, ASSIGNOR TO THE NATIONAL CASH REGISTER COMPANY, OF DAYTON, OHIO, A CORPORATION OF OHIO, (INCORPORATED IN 1906.)

CASH-REGISTER.

1,108,968.  Specification of Letters Patent.  Patented Sept. 1, 1914.

Application filed June 10, 1909. Serial No. 501,235.

*To all whom it may concern:*

Be it known that I, THOMAS CARROLL, a citizen of the United States, residing at Oakwood, in the county of Montgomery and State of Ohio, have invented certain new and useful Improvements in Cash-Registers, of which I declare the following to be a full, clear, and exact description.

This invention relates to cash registers and aims to improve the machines now existing, both in improving the construction thereof and in adding to their functions.

Cash registers having a plurality of totalizers are now well known and this invention aims to provide a machine of that type comprising two groups of totalizers and a main or grand totalizer whereby entries in the machine may be segregated according to two different classifications. With certain machines now on the market, several totalizers are carried in a rotatable reel or carrier and this construction though effective is objectionable in some cases for the reason that one totalizer only may be engaged with the operating devices at a time. By the provision of two groups of totalizers and means whereby a totalizer in each group may be simultaneously engaged with the operating devices, it is possible to enter transactions according to two different classifications, such for example as a classification according to clerks or operators and a classification according to kinds of transactions.

A main object of this invention, therefore, is to provide a series of clerks' or operators' totalizers and a series of transaction totalizers with means for engaging one totalizer from each series or group with the operating mechanism for any transaction.

This invention embodies in improved form a main totalizer, indicating devices, a printer, two sets of multiple totalizers, (clerks' and special transaction totalizers) and multiple drawers. Further, in the development of this invention, aside from the design of each unit of mechanism such as the totalizers or printing device, special attention has been given to attaining the desired interaction between the various units of mechanism in a simple and efficient manner. Also principles of mechanism have been employed which will permit the easy alteration of the machine into one of less capacity or one which performs fewer functions than are described in this specification, and as far as could be foreseen special attention was given to the provision of principles of mechanism which are adaptable for the performance of other or additional work than is at present required of cash registers.

This invention improves existing machines by the provision of an improved printing mechanism including means for printing a detail strip and a check or receipt, the construction being such that either or both of the printing mechanisms may be prevented from operation as desired. A manually operable element is provided which serves to disengage the detail strip printing mechanism and a further automatic device which will, in a sense, over-rule the hand operated element and provide for the printing of amounts of certain classes of transactions even if the manipulative device is set to prevent such printing.

The invention comprises other improvements, among which may be mentioned the provision of a plurality of cash receptacles which may be allotted to different operators with improved mechanism for releasing any desired one of the receptacles, this improved mechanism depending for operation on the operator identifying elements usual in this type of machine, and which also control the engagement with the operating devices of the totalizers of one of the groups.

In addition to the above main objects, certain subordinate objects such for instance as the key control of the machine, the common transfer devices for all totalizers of one group, and improved machine lock, are provided. The construction is such that the totalizers are in position to be read at any time, thereby preventing the necessity of rotating a carrier in order to read the totalizers, thus constituting a matter of further improvement.

With these and incidental objects in view, the invention consists in certain novel features of construction and combinations of parts, the essential elements of which are set forth in appended claims and a preferred form of embodiment of which is hereinafter described with reference to the drawings which accompany and form part of this specification.

Of said drawings: Figure 1 is a front elevation of the complete machine. Fig. 2 is a front elevation, but with the cabinet removed and with the printing mechanism omitted. Fig. 3 is a perspective view showing the printing mechanism, but in this view the multiple totalizers are omitted. Fig. 4 is a transverse vertical section taken on the line 4—4 of Fig. 2. Fig. 4$^A$ (Sheet 5) and Fig. 4$^B$ (Sheet 6) are details of the transfer mechanism also shown in Fig. 4; Fig. 4$^A$ showing it in advanced and Fig. 4$^B$ in normal position. Fig. 5 is a detail of one of the segments of the differential mechanism which is controlled directly by the keyboard. Fig. 6 is a transverse vertical section taken on the line 6—6 of Fig. 2. Fig. 7 is a detail of part of the key locking mechanism. Fig. 8 is an end elevation of the devices shown in Fig. 7. Fig. 9 is an elevation of the right hand side of the machine with the multiple totalizer mechanism omitted and cabinet removed. Fig. 9$^A$ is a detail of a locking pawl, which is shown in Fig. 9. Fig. 10 is a detail of one of the main driving gears showing one of the teeth of the gear partly cut away, for the purpose of co-acting with the locking pawl. Fig. 11 is an elevation of the left hand side of the machine, showing the printing mechanism and with cabinet removed. Fig. 12 is a side elevation of the controlling mechanism of the check printer. Figs. 13 and 14 are side and end elevations, respectively of the gearing shown in Fig. 12. Figs. 15 and 16 are details of the check feeding device in side and end elevation, respectively. Fig. 17 is a transverse vertical section partly broken away, taken on the line 17—17 of Fig. 2. Fig. 18 is a detail of part of the check feeding mechanism. Fig. 19 is a detail of an alining pawl which is also shown in Fig. 18. Fig. 20 is a plan view of the controlling devices of the check printing mechanism and the detail printing mechanism. Fig. 21 is a side elevation of the controlling device for the detail printing mechanism. Fig. 22 is a top plan of the main totalizer and its operative mechanism. Fig. 22$^A$ is a detail of one of the totalizer drums in side elevation. Fig. 22$^B$ is a detail of devices which are shown in Fig. 22, and which serve in disconnecting the totalizer from the differential mechanism, in controlling the printer, and in unlocking the machine. Fig. 22$^C$ is a perspective view of an arm shown in Fig. 22. Fig. 23 is a detail in perspective of one of the broad pinions of the differential mechanism, which pinions are used for operatively connecting desired elements of the differential mechanism. Fig. 24 is an enlarged detail view of the differential mechanism. Fig. 25 shows details of certain gears of the differential mechanism. Fig. 26 is a front elevation of the two sets of multiple totalizers. Fig. 27 is a front elevation of the operating mechanism for the multiple totalizers. Fig. 28 is a horizontal section of the operating mechanism for the multiple totalizers taken on the line 28—28 of Fig. 27. Fig. 29 is a central transverse vertical section of the multiple totalizers and their operating mechanism. Fig. 29$^A$ (Sheet 16) is a detail of one of the transfer slides of the special totalizers. Fig. 30 is an enlarged transverse vertical section partly broken away of the clerks' totalizers. Fig. 31 is a left side elevation of the multiple totalizer and multiple drawer selecting mechanism. Fig. 31$^A$ is a detail of a controlling lever shown in Fig. 31, which, upon certain operations of the machine, permits the opening of any desired cash drawer, independently of an actuation of the corresponding totalizer for the drawer. Fig. 32 is a detail of the means for rocking the special totalizers into operative position. Fig. 32$^A$ (Sheet 16) is a detail of the means for rocking the clerks' totalizers into operative position. Fig. 33 is a detail partly in section of the multiple drawer releasing mechanism which is shown in Fig. 31. Fig. 34 is a detail of part of the mechanism shown in Fig. 33. Fig. 35 is a detail of one of the shafts shown in Fig. 33. Fig. 36 is a rear elevation of the drawer releasing mechanism and shows part of the operating mechanism for the multiple totalizers. Fig. 37 is a side elevation of the multiple drawers and their latches. Fig. 38 is a detail of the machine locking mechanism. Fig. 39 is a detail of part of the mechanism shown in Fig. 38, but slightly enlarged. Fig. 40 shows a modified form of differential mechanism and indicator. Fig. 41 is a detail of the indicator shown in Fig. 40. Fig. 42 is a detail of a lever which is shown in Fig. 40. Fig. 43 which is a modification of the machine, is a front elevation and includes the modifications which are illustrated by Fig. 40.

Before describing the construction in detail, the main elements will be briefly described without particular reference to the drawings, giving thus a general description of the machine.

As previously pointed out, the different units of mechanism of this machine are a keyboard, the differential mechanism, the indicators, the main totalizer, two sets of multiple totalizers, multiple cash receptacles, and a printer. The essential function of the keyboard and differential mechanism of this machine, as in other cash registers, is to successively move or rotate the indicators, elements of the totalizers, and the type carriers different desired extents, but it is, at times, desirable to operate only certain of these devices, particularly only certain of the totalizers, when the machine is provided with a plurality of totalizers. For this reason, means are provided for connecting or disconnecting, at will, the differential mechanism and the operated devices. This means may be considered part of the differential mechanism itself, as it comprises broad intermediate pinions which may be simultaneously meshed with the driven members of the differential mechanism, and the actuating devices of the totalizers, etc., and may be slid longitudinally out of mesh or into mesh with desired sets of actuators. Particular care has been taken in the design of that feature, especially of the differential mechanism by which it may be operatively connected with only desired ones of the operated devices. This is possibly the most difficult to attain of all of the requirements of the differential mechanism and the shifting broad pinions which accomplish the purpose are regarded as satisfactorily embodying that idea in the present invention. The keys act directly upon members of the differential mechanism and set the same immediately upon the depression of the keys. This method of setting the differential mechanism is slightly different from that of most crank operated or motor driven cash registers. In most such machines, the keys act as stops for the differential mechanism which is not set until after the main driving shaft begins to rotate. In the machine of the present invention in which the differential mechanism is set before the rotation of the main drive shaft, all of the time needed for rotating the drive shaft may be employed in performing other work. The members of the differential mechanism which are set by means of the keys are in this case segment gears and each is located in a plane with its respective bank of keys to be directly acted upon by any key of the bank, but the key of lowest value is farthest away from the fulcrum of the segment and the key of highest value is closest the fulcrum, so that movement of the segment caused by the depression of the key of highest value will be correspondingly greater than the movement of the segment caused by the depression of the key of lowest value. The segments mesh with idle pinions and so perform no work when operated by the keys other than differentially setting these idle pinions. After the idle pinions are set in the desired positions, they are each operatively connected to a main setting element of the differential mechanism. These main setting elements are shown as segment gears and are connected to the operating devices of the indicators and of the printer and may also be connected to the main totalizer and to the operating devices of the two sets of multiple totalizers. After the setting or driving segments are operatively connected with the idle pinions, the idle pinions are returned to their zero positions by means of suitable mechanism operated by the main drive shaft of the machine. The return of the idle pinions to zero or normal positions causes the desired differential movement of the main totalizer and of the main operating segments, and through such segments the setting of the printer mechanisms and the operating mechanism of the two sets of multiple totalizers. The continued rotation of the drive shaft causes the platens to take impressions from the type carriers and the indicators to be set to the desired positions and also the desired operation of the multiple totalizers.

The keyboard besides being provided with the banks of amount keys is provided with one bank of clerks' initial keys and one bank of special transaction keys allotted to "received on account", "charge", and "paid out". The depression of one of the initial keys operatively connects the desired totalizer of the clerks' multiple totalizers with the differential mechanism. The depression of one of the special keys, "received on account", "charge", or "paid out", causes the desired totalizer of the special multiple totalizers to be operatively connected to the differential mechanism, but if no one of the special keys is depressed, the differential mechanism will be operatively connected to the main totalizer instead of to one of the special totalizers.

The machine is also provided with manipulative devices for making the printer inoperative, that is, for causing the printer to print only upon certain classes of operations, or either to issue a check or not issue a check or print upon the detail strip or not print upon the detail strip or to effect any desired combination of check and detail printing.

With this general statement of construction, the specific description may be proceeded with.

*Machine Drive.*—The driving mechanism of the machine receives motion from the crank handle 400 (See Fig. 9), which is mounted upon a small stub shaft carrying the pinion 117, meshing with a gear 122, rigidly mounted upon a main drive shaft 45. The gear 122 meshes with a gear 123, which is rigidly mounted on the counter shaft 23, and the shaft 45 also rigidly mounted thereon a gear 245, which meshes with a similar size gear 246, rigidly mounted on another counter shaft 244. The pinion 117 is half the size of the gears 122 and 123 and, consequently, by rotating the crank handle 400 twice, the shafts 45, 23 and 244 will be caused to make one complete rotation, upon each operation of the machine. A motor may be arranged to drive the pinion 117 in a similar way to make two rotations upon each operation of the machine. Each of the shafts 45, 23 and 244 carry devices, largely cams, which operate the various mechanisms of the machine and will be referred to in describing such mechanism.

*Keyboard and Differential Mechanism.*—The general arrangement of the keyboard and the segments controlled thereby may be seen from Figs. 1, 2, 4 and 5. Five banks of amount keys 1 and one bank of five initial keys 2, and one bank of three special keys 3, are shown in Figs. 1 and 2. Each bank of keys operates a segment gear 4, such as is shown in Fig. 5. The segment gears 4 are all journaled on a cross rod 5 and are acted upon by pins 6 carried by the shanks 7 of the keys.

The keys all move equal distances and are intended to rock their segments extents corresponding to the value of the keys. As will be seen from Fig. 2, the keys of highest value are at the bottom of the rank or row, and are, therefore, nearer the fulcrum rod 5 of the segments 4. It is, of course, necessary that the several keys should be separated by a space great enough to prevent the operator accidentally depressing two adjacent keys at once. Because of this the lower keys are nearer the fulcrum of the segments 4 than they would be if their whole stroke were to be employed in operating the segments. As is evident from Figs. 4 and 5, there is considerable lost motion space between the key pins 6 and the active edge of the segment 4, so that it is only during part of the stroke of the higher value keys that they move the segment. Because of this relation of parts, the higher value keys ordinarily would be harder to depress inasmuch as they have more work to do, but by the provision of a lever 8 fulcrumed to the machine frame on a pin 9, and bearing against a pin 10 from the segments 4, some of this lost motion may be taken up and employed in actuating the segment. As will be evident from Fig. 5, the lower end of lever 8 projects nearer the front of the machine than the active edge of segment 4, so that the 9 key may engage the end of lever 8, before the pin of the key would reach the active edge of segment 4. Clearly this decreases the effort required to press the 9 key by utilizing a larger proportion of its stroke in effective work. The segments 4 each have a rearwardly extending arm 11, which carries a pin 12, extending into notches 13 of sliding plates 14, provided with cam slots 15 which co-act with the pins 6 of the keys. The slots 15 are arranged at certain different angles in regard to the fulcrum 5 so that the lowering of the slides 14, upon depression of one of the keys, corresponds exactly with the degree of rotation of the segments 4, that is, when a segment 4 is rocked as far as the key depressed forces it, the pin 6 carried by such key will have reached the inner end of slot 15, and prevent further sliding of the plate 14, and thereby prevent an overthrow of the segment 4, as the segment 4 and plate 14, which are connected by the pin 12 must move together. Therefore, movement of one of the members forces a corresponding movement of its companion member. When the plate 14 is cammed downwardly by depressing one of the keys, the front edges between the slots 15 of the plate are brought opposite the pins 6 of the remaining keys and prevent their depression. It will be clear that depression of the keys serves to cause a positive rearward movement of segment 4, depending in extent on the keys depressed.

The operating connections from the segments, may be next described. The segments 4 are provided with teeth 16, which continuously mesh with the teeth of idle pinions 17, best shown in Figs. 22, 24 and 25. Each of the pinions 17 carries a pin 18 and the shaft 19 upon which the pinions 17 are loosely journaled carries a series of short arms 20, which co-act with the pins 18. When one of the keys is depressed, the rocking of the segment 4 will differentially rotate its respective pinion 17 to carry the pin 18 away from its co-acting arm 20 in the direction indicated by the arrow 21, Fig. 25, according to the value of the key which is depressed. Then when the drive shaft of the machine rotates it will cause the oscillation of the shaft 19 by means of a cam 22, which is mounted upon the drive shaft 23. This cam operates the segment 24 which meshes with a pinion 25, rigidly mounted upon the shaft 19. The groove in the cam 22 is so formed that the segment gear 24 will be oscillated once for each rotation of the drive shaft 23 and the drive shaft 23 makes one complete rotation upon each operation of the machine.

When the shaft 19 is oscillated, it first rocks oppositely to the direction indicated by the arrow 21 (Fig. 25), the arms 20, which it carries, engaging the pins 18 and through the pins 18 returning the pinions 17 to their zero positions, but after the pinions 17 have been differentially rotated by the segments 4, and before the shaft 19 is oscillated, broad pinions 26, (Figs. 4, 22 and 23), journaled upon a rod extending between a pair of arms 27, mounted upon the shaft 28, are rocked into mesh with the pinions 17 and two sets of similar pinions 29 and 30, thereby operatively connecting together each set of three pinions so that when the shaft 19 is oscillated to return the pinions 17 to their zero positions, it will likewise differentially set the sets of pinions 29 and 30. The frame which carries the broad pinions 26 is pivoted at 28 and is rocked by means of a cam 31 (Fig. 6), which is carried by the drive shaft 23 and co-acts with roller 32 carried by one of the arms 27 of the frame which carries the broad pinions 26. The pinions 29 of the sets mesh with the large segment gears 33 and carry pins 1855 which, when the pinions 17 are rotated by the arms 20, carried by the shaft 19, follow the arms 20 until these arms are at rest in their moved positions. The segment 33 of highest order is mounted directly upon the shaft 95 and the segment 33 of next lower order is mounted upon the sleeve 96, which immediately surrounds the shaft 95. The remaining segments 33 are mounted in the same order on the larger ones of the sleeves 96. After the indicators are set, the shaft 19 is returned to its initial position, the arms 20, through the pins 1855, causing the pinions 29 to return to their initial positions and thereby returning the large segment gears 33 to their initial positions. The broad pinions 26 are rocked out of mesh with the pinions 17, 29 and 30 when the segment gears 33 are at rest in their moved positions. Therefore, the return of the segment gears 33 will not effect the setting of the pinions 17 and 30, the segment gears merely being returned by their pinions 29 to their zero positions.

From the preceding description it will be seen that when the keys are depressed the segments 4 are positively moved to the rear a distance depending on the key, thereby rotating the driving pinions 17. When the machine is finally operated, the rotation of shaft 19 restores the pinion 17 to its normal position together with the segment 4, and thereby differentially positions the printer controlling devices and actuates the totalizer inasmuch as the broad gears 26 have been meshed with the idle pinions 17.

The segment gears 33 are each provided with a set of teeth 34 which mesh with small pinions 35 mounted on concentric tubes 387, and a shaft 3875 (Figs. 4 & 6), which extend through to the printing mechanism and there carry type wheels 251 (Fig. 3), corresponding in position to the particular denominations represented by their respective banks of keys. The banks of special and initial keys are similarly connected to type carriers 36 and 37 (see Figs. 1 & 3).

*Key detents.*—Each bank of keys is provided with a key detent 375 (Fig. 4) which is a punched plate provided with openings 376, adjacent each of the pins 6 of the keys. The upper surfaces of the openings are inclined so that the detents will rise slightly when a key is depressed for a purpose hereinafter described and when the pin 6, carried by the key reaches the notch 377, "formed in the openings 376" the detent will lower either by gravity or a suitable spring and retain the key in its depressed position. Each of the detents is provided with a pin 378 which extends between the forks of a series of arms 379, carried by a shaft 380. The shaft 380 also carries an arm 381 (Figs. 6 and 7), having a slot and pin connection 382 with a lever 383. This lever is rocked to throw the arms 379 upwardly soon after the drive shafts begin to rotate and thereby release all depressed keys, the arms 379 engaging the under side of the pins 378 of the key detents. The lever 383 is rocked to release the keys by a cam 384 rigidly mounted on the shaft 45, which cam engages the roller 3835 of the lever 383. The arms 379 and 381 on the lever 383 are restored to their initial positions by a spring 3805, coiled around the shaft 380, when the cut away part of the cam 384 comes opposite the roller 3835.

If any keys have been depressed by mistake they may be released independently of the mechanism just described by a lever 392; that is, before the drive shafts start to rotate. The lever 392 is pivoted at 393 and carries an upwardly extending arm 394, which, when the lever 392 is rocked downwardly, engages a pin 395 extending from the shaft 380 and rocks the said shaft to carry the lower prongs of arms 379 into engagement with the pins 378 of the key detents and lift the detents to release the depressed keys. The cam 384 carries a pin 385, which, when the cam is in its normal position, prevents rotation of the shaft 45, when the release lever 392 is rocked downwardly to release the keys, as when it rocks downwardly it causes the oscillation of the shaft 380, thereby, through the arm 381, rocking the lever 383 so that an extension 386 of the lever will move into the path of the pin 385. At the same time, an extension 390 of the lever 383 will move into the path of the pin 391 carried by a cam 62, serving to prevent rotation of the shaft 23, upon which the cam 62 is mounted. The shafts 23 and 45 being geared together, either one of the pins 385 or 391 will serve to prevent rotation of the drive shafts of the machine. The depression of any key will also cause the extensions 386 and 390 of lever 383 to rock into the paths of the pins 385 and 391 while the key is being depressed. The key detents are for this purpose beveled at the points where the pins 6 of the keys engage the key detents so that the detents will be lifted upward as hereinbefore described when the pins 6 are entering the slots 376 of the detents and before the pins reach the notches 377 of the slots. It will thus be seen upward movement of the detents causes the pins 378 to rock the arms 379, which are fixed to the shaft 380 and through the shaft and the arm 381 rock the lever 383 carrying the parts 386 and 390 of the lever into the paths of the pins 385 and 391. As soon as the pins 6 of the keys reach the notches 377 of the key detents, the detents will lower and thus permit the arm 383 to be returned to its normal position by means of the spring 3805. The mechanism shown in Fig. 7 serves to prevent the rotation of the drive shafts of the machine while keys are being depressed or when keys which have been depressed by mistake are being released.

*Connections to printer and indicator.*—Each of the segments 33 is slotted at 39, (Fig. 4), which slots curve away from the pivotal center of the segments and co-act with rollers 40 upon rocking beams 41 in such way as differentially to rock the beams 41 from their pivots 42 according to the differential rotation of the segments 33. When the beams 41 are thus rocked they correspondingly carry upwardly sliding members 43 which are hung from the center of the beams 41 at 44, according to the extent of rotation of the segments 33 and particular location of the pivotal points 42 at the time the beams 41 are rocked by the segments 33. The shaft 45 which is one of the main shafts of the machine carries a number of pairs of cams 46 and 47 which co-act with rollers 48 and 49 carried by the members 43. Movement of one of the segments 33 away from zero position causes its beam 41 to be rocked upwardly around the pivot 42 and to carry the roller 48 into the path of the cam 47, or the roller 49 either wholly or partly out of the path of the cam 46. This depends on the position in which the pivot 42 is left on the last previous operation of the machine. The segment 33 is then locked in its moved position and the shaft 45 is given a complete rotation causing the cams 46 or 47 to act upon their respective rollers and return the slides 43 to their initial positions; but at this time, as the segments 33 are prevented from rotating, the beams 41 will be compelled to rock around the pivotal points 40 and thereby cause the desired setting of the indicators 50 for which purpose the beams are connected by the links 51 with levers 52 which are rigid with the segments 53, loosely journaled upon a rod 54 and meshing with small pinions 55 which are rigid with the indicator drums 50.

After the indicators are set they are locked against movement by means of alining pawls 56 which at such time are held locked to the alining disks 57 of the indicator drums by the spring 58 stretched between the arm 59 on the shaft 61 of the alining device and a pin 60 extending from the side frame. There is a plurality of these alining pawls 56, one for each indicator, and they are all rigidly secured to the shaft 61, which carries the arm 59, so the single spring 58 serves to hold all of the alining pawls 56 in locking engagement with the alining disks 57. Before the cams 46 and 47 act upon the rollers 48 and 49, and, in fact, before the segments 33 are set, the cam 62 (Fig. 6), which is mounted upon the drive shaft 23 acts upon a roller 63 carried by an arm 595 on the shaft 61, and forces all of the pawls 56 out of locking relation with their co-acting disks 57. There is then nothing to prevent the rocking of the beams 41 from their pivots 40, and after the segments 33 have been set, the cams 46 or 47 engage their respective rollers on the sliding members 43 and through such members rock the beams 41 from the centers 40, the desired extents to set the indicators in accordance with the setting of the segment gears 33.

When the indicators are being rotated, the segment gears 33 are prevented from moving by the locking pawls 65, which enter between the teeth 34 of the segment gears. The locking pawls 65 are loosely mounted on the shaft 380 and are actuated by a pitman 66, which is reciprocated at the desired time by a cam 67, rigid with the drive shaft 45. The pitman 66 connects this cam with an arm 68, carried by a shaft 69 which is rectangular in cross section, is positioned below the locking pawls 65, and is partly cut away at 70 just below the pawls 65 to allow the pawls to rock out of engagement with the teeth 34 of the segment 33, at the proper time. When it is necessary to lock the segments 33 in their moved position, the shaft 69 is oscillated by means of the pitman 66, thereby bringing the part 71 of the shaft into engagement with the pawls 65 and forcing the pawls into locking relation with their segments 33.

The mechanism for setting the indicators is an improved form of the mechanism for doing this work which is described in my co-pending applications Nos. 270,786 and 355,924; but in both the prior and the present cases, the indicators are set from one reading directly to a new reading without first returning to their zero position. This desirable function is obviously attained by the construction just described, but is not part of the present invention, except as to the form of some of the parts.

*Main totalizer.*—The amounts of all cash sales are accumulated in the main totalizer which is shown in detail in Fig. 22. The amounts of "Received on account", "Charge" and "Paid out" transactions are accumulated in the special multiple totalizers. The main totalizer not only comprises denominational elements corresponding in number to the banks of denominational elements of the keyboard, but in addition is provided with three or four denominational elements of higher order than are represented by the keyboard, for the purpose of receiving transfers from the elements of lower order. Each denominational element of the totalizer comprises a small drum 78 bearing numerals from "zero" to "nine", and a pinion and a ratchet 87 which are fixed to the drum. The pinion receives movement from the differential and the ratchet receives movement from the transfer mechanism when a transfer is effected. The ratchet also co-acts with a spring pressed retaining pawl 88 mounted upon a rod 77 (Fig. 4ᴬ), extending between the side frames. The pinions 78 of the totalizer mesh continuously with the set of pinions 30 of the differential mechanism and receive motion from such pinions, as previously explained, when the broad pinions 26 mesh with the sets of pinions 17, 29 and 30 and the set of pinions 17 are returned to their zero positions. When one of the pinions 78 of the totalizer passes from the "nine" to the "zero" point, a pin 79 carried by such pinion, will engage a trip 80 and rock the trip 80 from below the lug 81 carried by the transfer pawl 83 of the ratchet 87 of next higher order and permit the pawl to be rocked by the spring 84 into position for engaging the tooth of the ratchet which is at 85 (Fig. 4ᴮ, Sheet 6). At the time the totalizer is operated, the transfer pawls 83 are in their rear positions with the lugs 81 resting in the notches 86 of the trip pawls 80. After the totalizer has been operated, the usual successive cams 835 carried by main shaft 23, rock the pawls 83 forwardly and such of the pawls as have been tripped will rotate their respective ratchets 87 one tooth space. The pawls 83 which have not been permitted to lower remain in engagement with the notches 86 of the trip arms 80, and cause the trip arms 80 to swing forwardly with the pawls and thereby prevent the pawls from engaging their respective ratchets. The transfer pawls 83 come to rest in front of the uppermost teeth of the ratchets 87, as illustrated in Fig. 4, the tip of the pawls being about midway between the base and the point of the teeth upon which they rest. Fig. 4ᴬ shows one of the pawls 83 in its extreme forward position, to which position all of the pawls are brought whether actually transferring or not, just before the transfer pawls are restored to their normal positions. When the transfer pawls are in their extreme forward positions, it is impossible to rotate the totalizer pinions beyond the position to which the transfer pawls or the differential mechanism sets them, as the pawls are provided with extensions 836 which co-act with extensions 873 of the arms 82 to prevent the transfer pawls from being lifted clear of the ratchets 87 (Fig. 4ᴬ). By this arrangement it is impossible for the totalizer pinions to overthrow at the time of transferring, even if the pawls 83 are thrown forwardly very quickly.

*Main totalizer throwout.*—When transactions other than cash sales are to be recorded, the establishment of a cooperative relation between the main totalizer and the differential mechanism is prevented by sliding frame carrying the broad pinions 26 to the right so as to move the pinions 26 out of the planes of the pinions 30, which mesh with the pinions 78 of the totalizer. The sliding of the frame which carries the broad pinions 26 is accomplished by a lever 90 (Figs. 17—22 and 22ᴮ), which may be rocked into the path of the conical end 91 of the broad pinion shaft 92 by means of any of the special keys. The lever 90 is loosely pivoted on the shaft 341 and is rocked by means of a pin 342 which is mounted on that one of the segment gears 4 which is actuated by the special keys. (Figs. 17 and 22). If any one of the special keys is depressed, the segment 4 of that bank is rocked and the pin 342 will engage the lever 90 and move the same into the path of the conical part 91 of the shaft 92. Then, when the frame which carries the broad pinions is rocked forwardly to mesh the broad pinions with the gears 17, 29 and 30, the conical end 91 of the shaft 92 will engage the beveled end of the lever 90 and cam the frame which carries the broad pinion 26 far enough to the right to move the broad pinions out of line with the pinions 30. The groove in the cam 31 which rocks the broad pinions 26, is deep enough that the shifting of the pinions in a longitudinal direction will not cause the roll 32 to move out of the race in cam 31. (Fig. 6). When the broad pinions 26 are moved to the right, the teeth 2605, which are carried by collars rigid with the shaft 92, upon which the broad pinions are mounted, engage the teeth of the totalizer actuating pinions 30, thereby preventing accidental rotation of the totalizer pinions.

The broad pinions 26, even when moved as described, will still mesh with the pinions 17 and 29. Therefore, the differential segments 33 will be rocked the desired extents, when pinions 17 are returned to normal, and will communicate the differential setting to the actuating racks of the special and clerks' totalizers through the shaft 95 and the sleeves 96, upon which the segments 33 are mounted, (Figs. 6, 29 and 36), so that the multiple totalizer may be operated even if the main totalizer is "thrown out" of operation. On shaft 95 and sleeves 96 are respectively mounted the segment gears 97 (Figs. 29 and 36). The set of segment gears 97 serve to actuate the racks 162 for operating the special totalizers and the racks 100 for operating the clerks' totalizers. When the broad pinions 26 (Fig. 22) are rocked backwardly to their normal position after having been meshed with the sets of pinions 29 and 17, the conical end 331 of the shaft 92 engages the conical boss 332 on the machine frame 333 and pushes the shaft in a longitudinal direction to its normal position with the broad pinions 26 opposite the three sets of pinions 30, 29 and 17.

*Main totalizer resetting mechanism.*—In order to reset the main totalizer wheels to zero position, each of the totalizer wheels carries a small spring pressed pawl 123 (Fig. 22^A) which bears against the totalizer shaft 75 which is normally prevented from rotating, but may be rotated by hand by a knurled head 169 for the purpose of resetting the totalizer in the same direction in which the totalizer wheels are ordinarily rotated by the differential mechanism. The shaft 75 is provided with a groove 161 which, when the shaft is rotated will engage all of the pawls 123 and force the pinions 78 to rotate with the shaft 75 to their zero positions. It is immaterial in what position the pinions are when the shaft 75 is rotated, as the groove 161 in the same is moved in a forward direction from its zero position around to its zero position again, picking up the pawls in whatever position they may be set, as is common in the art. The knurled head 169 is carried by the shaft 174, (Figs. 2, 22 and 38) which also carries the pinion 335 meshing with a pinion 336 rigidly mounted upon the totalizer shaft 75.

The shaft 75 carries a notched disk 337 which co-acts with a spring pressed retaining pawl 338, best shown in Fig. 39, to prevent more than a complete rotation of the totalizer shaft and thereby prevent the totalizer from being rotated more than once in a resetting operation. As shown in Fig. 39, the pawl 338 is mounted on shaft 341 with a slotted connection and is drawn in one direction by a spring 344. In the position shown in the said figure, shaft 75 cannot be rotated inasmuch as the notched disk 337 engages the end of pawl 338. On each operation of the machine, however, shaft 341 is operated, thereby raising the arm 340 fast on said shaft, so that the pin 339 on said arm engages and lifts the locking pawl 338, inasmuch as the end of the pawl is above the notched disk 337, and the spring 344 draws it forward so that when the pin 339 descends again at the end of the operation, the pawl 338 will still remain elevated and in a position permitting rotation of shaft 75. When the totalizer is to be reset, the shaft 75 is rotated and as it finishes a complete rotation, the notch of disk 337 again engages the end of pawl 338 and forces it to the left in Fig. 39, thereby tensioning the spring 344 and finally locking the notched disk when the right hand end of the slot in pawl 338 reaches the shaft 341. The resetting shaft 174 carries a cam disk 346 (Figs. 9 and 38) which is cut away at 347 where it is normally engaged by a bell crank lever 348, loosely pivoted on the shaft 341, and rotation of the shaft 174 will rock the said bell crank lever on its pivot 341 and the end 300 of the bell crank lever will enter the space 351 made by cutting away a portion of the gear 123. (Figs. 9 and 10). The cut away part of the gear is opposite the end 300 of the bell crank lever 348 when the drive shaft 23 is in its normal position. It is then possible to reset the totalizer and when resetting the totalizer operation of the machine is prevented, as the part 300 of the bell crank lever then engages the gear 123. But, if the shaft 23 is moved away from its normal position, one of the full teeth of the gear 123 will come opposite the end 300 of the bell crank lever 348 and prevent the bell crank lever from being rocked out of the path of the disk 346 on the shaft 174. It is, therefore, impossible to reset the totalizer except when the machine is at rest in its normal zero position, and also impossible to operate the machine while the totalizer is being reset.

*Machine lock.*—The regular machine lock is illustrated in Figs. 9 and 9^A. It is actuated to permit operation of the machine by the depression of any one of the initial keys. The machine lock 352 is rigidly mounted on the shaft 341 and when one of the initial keys is depressed, it rocks upwardly clear of the pin 353 carried by the drive gear 123 and permits rotation of the gear 123 and, therefore, the operation of the machine. In describing the main totalizer resetting mechanism, the method of oscillating the shaft 341 was described, namely, when any of the initial keys is depressed the pin 3435 which is carried by the segment 4 of the bank of initial keys engages arm 343 which is rigidly secured to the shaft 341 and causes the shaft to be rocked thereby carrying the locking pawl 352 clear of the pin 353.

The locking pawl 352 is of a peculiar shape, as shown in Fig. 9^A, it having two surfaces 3525 and 3526 for co-acting with the pin 353. These surfaces are slightly offset with respect to each other. The pawl is made in this form for the following purpose. Suppose the pawl was not provided with these offset surfaces and through wear between the pins 391, 385 (Fig. 7), and the extensions 386 and 390 of the lever 383, it would be possible to slightly rotate the drive shafts when the extensions 386 and 390 of the lever are in the paths of the pins 391 and 385 as is the case when any key is partly depressed or when lever 392 is operated to release depressed keys. It would then be possible to operate the machine in the following manner: First, depressing an initial key thereby lifting the pawl 352 clear of the pin 353 and then turning the crank handle 400 far enough to bring the pin 353 below the tip of the pawl, thereby holding the pawl up, but not far enough to bring the pin 385 into the path of the extension 386 of the lever 383. The key could then be released, causing the return of the segment 4 to its initial position, and the machine then operated without causing a record to be made of the depression of the initial key. By providing the pawl 352 with two offset engaging surfaces at 3525 and 3526, when the crank handle 400 is rotated as far as possible before positively preventing the release of the depressed keys, the pin 353 will not have reached the extreme tip of the pawl 352 and if the keys are then released, the pawl will drop over the pin 353 so that its surface 3526 will engage the pin and prevent rotation of the drive shafts. It is, therefore, impossible to operate the machine without leaving one of the initial keys depressed.

All keys are released before the shaft 45 makes one-sixth of a rotation, the cam 384 engaging the roller 3835 of the arm 383, causing the arm 383 to rock the arms 379 upwardly and thereby lift the key detents clear of the pins 6 of the keys and permit the keys to spring back to their outer positions. The segments 4 are then returned to their normal positions, thereby permitting the locking pawl 352 to return to its normal position in the path of the pin 353 where it acts as a stop preventing the gear 123 from moving past the home position.

*The special indicators.*—The special keys control elements of the differential mechanism which are duplicates of the elements controlled by the amount keys with the exceptions that no intermediate pinion 30 is included in such elements, and, therefore, the setting of the totalizer is not effected by the depression of a special key, and that the connection between the segment of the differential mechanism which is controlled by the special keys and the special indicator is somewhat different from the connections between the segments controlled by the amount keys and their indicators. The special indicator is shown in Figs. 2, 3 and 4, at 101 and is rectangular in form with the words " Cash ", " Received on account ", " Charge " and " Paid out " lettered thereon in two sets, one for reading from the front of the machine and the other for reading from the rear of the machine. It is mounted upon the shaft 102 which carries the small pinion 103. This pinion meshes with a segment gear 104 which is carried by the shaft 105, which shaft also carries the arm 106 which is connected by a link 107 to a beam 108 (Fig. 17) which beam is similar to the beams 41, which were previously described in connection with the differential mechanism controlled by the amount keys.

The special indicator is locked in its set position by an arm 109 pivotally mounted on shaft 61 (Fig. 9) which arm carries the pin 110 for entering the notches 111 of an alining disk 112, which is rigid with the shaft 102 upon which the special indicator is mounted. The arm 109 is rocked into engagement and out of engagement with the alining disk 111 at the proper times by the cam 62, which is carried by the rotating shaft 23 (Fig. 6). The timing of this cam 62 is such that the arm 109 will be left in engaged position with the disk 112 after each operation of the machine. This being the case, it is then impossible to rotate the special indicator, but soon after the drive shafts start to rotate, the aliner 109 is rocked away from the disk 111, and the beam 108 may then be rocked around its pivotal connection 115 with the link 107 (Fig. 17) or from its pivotal connection 124 with the slide 120 and will be differentially rocked by the segment 33, which is under the control of the special keys 3 in the same manner as the respective segments 33 of the amount keys are controlled by the amount keys and the segment 33 of the special bank is also locked in its set position by one of the locking pawls 65. It is then impossible to further rock the beam 108 around its pivots 115, or 124, but at this time the arm 109 is held away from the alining disk 112 of the special indicators with the pin 110 clear of the disk 112, so it is then possible to rock the beam 108 around its pivot 118 where it is connected to the segment gear 33.

The normal position of the special indicator is the position in which it indicates the word " Cash ". If one of the special keys has been depressed, the beam 108 will be rocked upon its pivot 115 in such manner as to bring the roll 119 carried by the slide member 120, which is hung from the beam 108 into the path of the cam 121, carried by the shaft 45. When the shaft 45 is rotated, the cam 121 will engage the roll 119 and will return the slide 120 to its initial position, but as at this time the segment gear 33 is prevented from rotating by the alining pawl 65, the beam 108 will be compelled to rock from the pivot 118 upon the return of the slide 120, therefore, rotating the segment gear 104 an amount which corresponds to the extent of lowering of the roll 119. After the special indicator has been set, the arm 109 is again rocked toward the alining disk 112, thus locking the indicator in its set position. The segment 33 is then returned to its home position without effecting the setting of the special indicator as the beam 108 then merely rocks around the pivot 115. When the segment 33 is returned to its home position, the pin 119 will, of course, be again moved into the path of the cam 121, so if the machine was again operated without first setting the segment 33 of the special keys (as is the case when a cash sale is recorded), the special indicator would then be returned to its normal position indicating the word " Cash " at the sight opening.

*Indicator screens.*—Cash registers are usually provided with slides or screens which cover the indicators at the time they are being set. The screen is then moved to expose the indicators in their new setting. In the present machine the screens 125 and 126 for the amount indicators are carried by a pair of slides 127, (Fig. 6) one of which slides is connected by a link 128 to a lever 129 fast on the shaft 130. The shaft 130 also carries a lever 131 which is provided with a roll 132 for co-acting with a cam 133, carried by the shaft 244 which is geared to the drive shaft 45 by the pair of gears 245 and 246 (Fig. 9). A link 136 connects one of the slides 127 to an arm 137 which is rigid with a pair of screens 138 and 139 for the special indicator, loosely journaled on the shaft 102. The cam 133 which operates the flash or screen mechanism is timed to lower the screens 125 and 126 to cover the indicators just before the indicators are rotated and to permit the screens to rise soon after the indicators have been set. The screens 138 and 139 rotate to cover the special indicator at the time the screens 125 and 126 are lowered because of the link and lever connection between the two sets of screens.

*The special totalizers.*—The special totalizers are arranged or connected to the special indicator in such a way that desired ones of these totalizers will be selected for operation by the setting of the special indicator. The special indicator serves to position two slides which are moved in the direction of their length by the indicator, one of which slides controls means for locking the special totalizers against being moved into mesh with the operating racks for the totalizers, but may be moved to permit a desired one of the totalizers to be rocked into mesh with the actuating racks, and the other slide may be rocked from a pivot to carry the particular totalizer which is not locked against movement into mesh with the actuating racks.

The special indicator carries a pair of small pinions 140 and 141 which mesh with racks 142 and 143 which are carried by the slides 144 and 145 (Figs. 2 and 31). The slides 144 and 145 will, therefore, be caused to move to positions which correspond to the positions to which the special indicator is moved, for instance, if the special indicator is in its normal "cash" position, the slides 144 and 145 will be in their uppermost positions. If the indicator is moved to the "received on account" position, the slides 144 and 145 will be moved down one step; if the indicator is moved to the "charge" position, the slides 144 and 145 will be moved down two steps; and if the indicator is moved to the "paid out" position, the slides will be moved down three steps. These slides constitute the special counter selecting mechanism and by referring to Fig. 31, it may be seen that if the slides are moved down one step, the pin 146 which is carried by the slide 145 will be moved between the shoulders 147 of the link 148 which link is slidably mounted at one end upon a fixed pin 149, and at its other end is pivoted at 150 to a crank 151 which is rigidly mounted upon a shaft 152. This shaft 152 carries the carrying frame 153 (Fig. 29) of the "received on account" totalizer. The slide 144 is movable in a vertical plane only, while its companion slide 145 may be rocked around the point where it surrounds the special indicator shaft 102. The slide 145 is slotted at 154 (Fig. 31 and 32ᴬ) for the purpose of encircling a roll 155, which is carried by a bell crank lever 156 pivoted upon a shaft 157, and acted upon by a cam 158, carried by the shaft 159. The cam 158 acts upon a roller 160 of the bell crank lever to rock the bell crank lever rearwardly and thus swing the slide 145 rearwardly around the shaft 102, after the slide 145 has been moved the desired extent in a vertical plane.

If, at the time the bell crank lever 156 is rocked rearwardly, the pin 146 of the slide 145 is between the shoulders 147, the link 148 will be moved rearwardly and thus rock the "received on account" totalizer into engagement with the operating racks 162 (Fig. 29) for the special totalizers. If the "charge" key has been depressed, the slides 145 and 144 will be moved down two steps, thereby bringing a pin 163 of slide 45 between shoulders 164 of a link 165, which is connected to the carrying frame of the "charge" totalizer. When the pin 163 is moved to the position between the shoulders 164, the pin 146 will pass entirely beyond the shoulders 147 and will, therefore, not be operatively connected to the link 148, so, when the slide 145 is rocked rearwardly, the "received on account" totalizer will remain in its disengaged position, while the "charge" totalizer will be thrown in mesh. If the slide 145 is moved down three units of movement, both the pins 146 and 163 will pass beyond their co-acting shoulders on the links 148 and 165, and a pin 166 will enter between shoulders 167 of a link 168, which effects the meshing of the "paid out" totalizer with the operating racks 162.

The other slide 144 is slotted at 170, 171 and 172 at such points that one of the slots will be brought opposite one of a series of pins 173 carried by the links 148, 165 and 168 to permit movement of the particular slide which it is desired to actuate in order to throw into mesh a particular one of the special totalizers, thus if the slide 144 is lowered one unit of movement, the notch 170 will come opposite the pin 173 of the links 148, but the notch 171 will not lower enough to come opposite the pin 173 of the links 148 and the notch 172 will not lower enough to come opposite the pin 173 of the links 168. In such case, the "charge," and "paid out" totalizers will be locked out of mesh, while the "received on account" totalizer may be moved into mesh with the actuating racks 162. If the slide 144 is moved downward two or three units of movement then either the "charge" or "paid out" totalizer may be meshed with the actuating racks.

The mechanism which has just been described is the selecting mechanism for the special totalizers. The totalizers themselves are constructed as follows: The construction of the special totalizers may be seen from Figs. 26, 29 and 30. Each of the totalizers comprises a plurality of pinions having ten teeth and each pinion carries a drum numbered from zero to nine. All of the totalizer pinions of each totalizer are loosely journaled upon shafts 175 which are carried by frames 153 which frames are carried by shafts 152. The actuating racks 162 for the special totalizers are slidably mounted on the shafts 176 and 23 and receive differential movement from the concentric sleeves 96, which are secured to the main operating segments 33. These sleeves carry the segments 98 which, by means of the broad pinions 178, are connected to the segments 97. The segments 97 mesh with gears 179, which are loosely journaled upon the shaft 180, but when the gears 179 are rotated by the segments 97, they rotate the shaft 180 in the same direction by means of the pawls 181 which are carried by the gears 179. The pawls 181 are spring pressed into a groove 182 in the shaft 180, which shaft will, therefore, be rotated the same number of degrees as the gear 179, which is rotated the greatest number of degrees. There is, of course, one gear 179 for each denominational element of the differential mechanism and each of the gears 179 is operatively connected to a companion gear 183 (Fig. 28) by means of the broad pinions 184 and each of the gears 183 meshes with one of the racks 162. Therefore, when the gears 179 are rotated in the direction indicated by the arrow 185, the racks 162 will be lowered extents which correspond to the amount of rotation of the gears 179.

When the racks 162 are in their lowered positions, the desired totalizer is rocked into mesh with the racks by the special totalizer selecting mechanism which was previously described. At the same time, the broad pinions 178 are moved out of mesh with the segments 97 and 98 and the segments 33 and 98 are returned to their zero positions without in any way affecting the differential mechanism for the special totalizers.

The shaft 180 carries a pinion 1835 (Fig. 31) which meshes with a segment 1845, and when the shaft 180 is rotated by the gears 179, it will cause the roller 185 of the segment gear 1845 to be moved more or less into the path of one of the cams 186 (Figs. 28 and 31), carried by the shaft 23 and, when the shaft 23 is rotated, the cam 186 will rock the segment 1845 back to its initial position and thereby return the shaft 180 to its initial position. When the cut 182 in the shaft 180 (Fig. 29) reaches the pawls 181 of their respective gears 179, it will engage the pawls and thereby cause the gears 179 to be returned the same number of degrees that they were previously forwardly rotated, and as these gears are connected to the gears 183 by the broad pinions 184, the racks 162 will be returned upwardly to their original positions and rotate the desired extent, the pinions of the particular totalizer which is meshed with the racks 162.

Each rack 162 has a companion transfer trip bar 188 (Figs. 29 and 29^A), which carries a pin 189 projecting into the path of a rocking stop arm 190, carried by the rack 162 of next higher order. These transfer trip bars 188 are actuated by cams 191 which are carried by the totalizer pinions and which cam the slides 188 downwardly in an oblique direction when the pinions pass from the nine positions to the zero positions. The pin 189 will thus rock the stop arm 190 of next higher order out of alinement with a fixed stop 192, or, if the rack 162 of next higher order is not in its zero position, the pin 189 will be brought into the path of the stop arm 190, so that upon the return of the rack 162, the stop arm 190 will cam against the pin 189, and so be forced out of alinement with the stop 192. This will permit the rack of next higher order than the pinion which actuated the slide 188 to move upwardly an additional tooth space and thus effect the desired transfer.

The additional upward movement is effected by one of the bell crank levers 193, which are actuated by the successively arranged cams 194, but before the bell crank levers are moved upwardly the broad pinions 184 are moved out of mesh by means of a cam 195, which is carried by the shaft 45 and actuates a pitman 196 (Fig. 31), which connects the cam to the frame 197, carrying the broad pinions 184. The reason the broad pinions 184 are held out of mesh while the transfer is effected is that the segments 97 mesh with the racks 100 which actuate the clerks' totalizers, and if there was a permanent connection between the racks 162 and the racks 100, the extra unit of movement of the racks 162 upon transferring would be communicated to the rack 100. The totalizer which has been actuated will then be rocked out of mesh with the racks 162 and the bell crank levers 193 returned to their original positions and thereby allow the racks 162 to return to their zero positions, ready for the next operation of the machine. The transfer devices are actuated successively as is usual from the lowest to the highest denominational orders.

*Clerks' totalizers.*—The segments 97 besides accomplishing the differential movement of the racks 162 likewise accomplish the desired setting of the racks 100 for the clerks' totalizers. The clerks' totalizers are identical in construction with the special totalizers and are provided with the same kind of transfer mechanism which is operated by the bell crank levers 199 co-acting with successive cams 200 on the shaft 201, which is geared to the main drive shaft 45 by means of the gears 202, 203 and 204, (Fig. 29). The transfer slides 205 of the clerks' totalizers are mounted similarly to the slides 188 of the special totalizers, but are guided in their movement by three rods, namely, the rod 206, 207 and 208, while the slides 188 of the special totalizers are guided by the rod 176 and shaft 23. Both sets of slides are provided with suitably inclined slots which encircle their guide rods and cause the slides to move downwardly and rearwardly when actuated by the transfer cams of the totalizer.

The transfer trip slides 188 and 205 are held in their tripper positions the desired length of time by the pawls 209 and 210 respectively which spring into notches 211 and 212 of their respective slides. After the transfer has been effected, the pawls 209 and 210 are rocked out of engagement with the slides by means of the pitmans 5375 and 5376 driven by cams on shafts 159 and 45 (Fig. 81). The slides 188 and 205 then return to their normal positions under the action of their respective springs 213 and 214, but to insure the positive return of the slides 188 and 205, cams 1885 and 2055 which co-act with rolls 1886 and 2056 of the slides are, at this time, actuated in order to raise the slides. These cams are carried by the shafts 1887 and 2057 which are oscillated by the pitmans 1888 and 2058, which are actuated by the rotating shafts 159 and 45.

The selecting mechanism under the control of the initial keys for selecting the clerks' totalizer and also for causing the opening of a desired cash drawer is illustrated in Figs. 31, 32, 33, 34, 35, 36 and 37. The segment 4 which is actuated by the initial keys (Fig. 33) is pivoted to a rack 216 which is adapted to mesh with the pinion 217, carried by the shaft 157, and is guided by a pin 218 carried by a bell crank lever 219. After the rack 216 is moved rearwardly because of the differential movement of the segment 4, it is then thrown into mesh with the pinion 217 by the bell crank lever 219, which is, at this time, raised by the cam 220 on shaft 244. The shaft 157 is rotated by the rack 216, upon the return of the segment and the shaft 157 carries a cam 221 which acts upon a roller 222 carried by a slide 223 and causes the slide to rise an extent which corresponds to the amount of rotation of the cam 221. The slide 223 carries a plurality of pins 224 which extend through arms 225 (Figs. 31, 33 and 36), and depending upon the amount of upward movement of the slide 223, one of the arms 225 will be brought opposite one of a series of openings 227 in a fixed upright 226. The shoulder 230 of such arm will also be moved opposite the shoulder 228 of the lever 229 (Fig. 31). The lever 229 is then rocked rearwardly, engaging the shoulder 230 of the arm 225 which has been moved into its path and causing the arm to be projected through the corresponding opening 227 in the upright bar 226. The lever 229 is actuated by the spring 2355 and the cam 231 carried by the shaft 45 (Fig. 32) The arms 225 are connected to levers 232 which are carried by the shafts 233 upon which the frames 234 which carry the clerks' totalizers 235 are mounted. Therefore, when any arm 225 is moved rearwardly, the clerks' totalizer to which it is connected will be rocked into mesh.

After the multiple totalizers have been actuated by the racks 162 and 100, they are rocked out of mesh by the cam 158, Fig. 32A) and the springs 2335 which are coiled around the shafts 233 (Fig. 31). There is an endless channel in the cam 158 so the completion of the rotation of shaft 159 serves to return the slide 145 carrying with it the particular totalizer which had been meshed with the racks 162. The cam 221 (Fig. 33), which serves to raise and lower the slide 223 is mounted upon the oscillating shaft 157, and for this reason the channel in the cam 221 has a spiral groove. The shaft 157 is partly rotated in one direction to cause the rise of the slide 223 by the rack 216, as previously explained, and is backwardly rotated to its initial position to cause the slide 223 to be returned to its lowest position by the segment gear 1575, which is pivoted at 1576 to the frame of the machine and meshes with the pinion 1577, which is fixed to the shaft 157.

When the shaft 157 is partly rotated to cause the slide 223 to rise, a roll 1578 carried by a segment gear 1575 will be brought into the path of one of the cams 186 (Figs. 28 and 31), which cam, at this time, is not in the path of the roll 1578, but at the completion of the rotation of the shaft 23, upon which the cams 186 are mounted, one of the cams engages the roller 1578 and thereby causes the segment gear 1575 to rotate the shaft 157 back to its initial position, thereby causing the cam 221 to return the slide 223 to its original position. The arm 229, (Fig. 31), is then returned to its initial position by the cam 231 (Fig. 32), thereby permitting the arm 225 which has been projected through one of the openings 227 to be drawn back to its initial position by its spring 233, and accordingly rocking the clerks' totalizer out of mesh.

Both the special totalizers and the clerks' totalizers are provided with square headed shafts, as indicated at 405 and 496 (Fig. 23), arranged that the shafts may be rotated by means of a wrench for the purpose of resetting the totalizer. These shafts are grooved and the totalizer drums carry co-acting pawls as is the case with the main totalizer. This construction is illustrated by Fig. 22^A.

*Drawer controlling mechanism.*—Extending below each opening 227 is a lever 236, which is pivoted at 237 to a common upright bar 238, and these levers at their left hand ends (Figs. 36) carry links 239 which are connected at their lower ends 240 to the drawer latches 241. After one of the arms 225 has been projected through an opening in the upright 227, the bar 238 is moved upwardly by a pin 242 (Fig. 34), carried by an arm 243, upon the rotating shaft 244, which is geared to the drive shaft 45, by the gears 245 and 246 (Fig. 9). The pin 242 of the arm 243 acts upon an arm 247, which is secured to the bar 238. When the bar 238 is moved upwardly, all of the levers 236 will rock around their pivots 248 where they are connected to the links 239 except the lever which extends in under the arm 225, which has been projected through an opening 227 in the upright 226. This particular lever 236 instead of rocking around its pivot 248 will rock around the arm 225 which has been moved into its path, the arm serving as a fulcrum for the lever, and in so rocking will raise its particular link 239, and the drawer latch which is connected to the link, and thereby release the desired one of the cash drawers, as the latches 241 co-act with the detents 249, which are carried by the cash drawers. The latches are urged by the springs 250 into latching position, and when the cash drawer is closed, its particular detent 249 will cam the latch upwardly until the detent 249 has passed the co-acting shoulder on the latch 241, when the latch 241 springs downwardly and retains the cash drawer in its closed position.

It is possible to open any cash drawer independently of movement of the corresponding clerks' totalizers into mesh with the totalizer actuating racks 100. The clerks' totalizers are added to, only when "cash" and "received on account" sales are recorded. Therefore, it is not necessary to throw any of the clerks' totalizers into mesh when "paid out" or "charge" transaction keys is depressed, and these keys control means for regulating the throw of the lever 229 (Fig. 31), so that it will cause a desired one of the bars 225 to be projected through its opening 227 in the plate 226, but not far enough to cause it to rock the clerks' totalizer into mesh with the actuating racks. In order to open any desired cash drawer independently of moving the clerks' totalizer into mesh, which may be desired when "paid out" or "charge" special transactions are recorded, it is necessary to depress one of the special transaction keys 3 and one of the initial keys 2.

The depression of the initial key serves to position the slide 223 to bring the desired one of the flanges 230 of the bars 225 into the path of the flange 228 of the lever 229. By depressing one of the special transaction keys, the pin 10 of the segment 4 of such bank (Fig. 17), will engage the arm 397, which is mounted upon the shaft 398, and cause the shaft to rock the lever 399 which it carries (Figs. 31 and 31^A) downwardly to bring the part 402 of the slot 3995 over the pin 400 of the lever 229. Then, when the lever 229 is drawn rearwardly by the spring 2355, it will be prevented from rocking far enough to cause the arm 225 to carry its totalizer into mesh, but it will rock the arm 225 far enough to cause the end of the arm to be projected through the opening 227 in the plate 226, thereby positioning it to effect the opening of its respective cash drawer, as previously described. The part 402 of the slot 3995 is shorter than the part 401 of the slot. Therefore, when the pin 400 is in the part 402 of the slot, the backward movement of the lever 229 is less than the movement of the lever when the arm 399 is in its normal position.

The "received on account" key is the upper one of the bank of special keys. Therefore, the depression of it will not rock the segment 4 of the special bank as far as it is rocked by the other two special keys and the arm 397 is cut away at 3975 in order that when the segment 4 is rocked by the depression of the "received on account" key, the arm 397 will not be rocked and will, therefore, not prevent the meshing of the clerk's totalizer.

*Printing mechanism.*—The printing mechanism is shown in Figs. 1, 3, 11, 12, 13, 14, 15, 16, 18, 19, 20 and 21. The type carriers or wheels 251 of the printer are set to the desired positions by the segments 33, which mesh with pinions 35 carried by the shaft 3875 and a plurality of sleeves 387, upon the outer end of which the type carriers are mounted. There are five of these type carriers 251 numbered from zero to nine, connected to the differential mechanism of the amount banks and one clerk's initial type carrier 37, and another type carrier 36, which carries the characters which designate the class of transaction. The type carriers are provided with two sets of type, one for printing upon the detail strip 252 and the other for printing upon the check strip 253.

Platen 254 is for causing impressions to be made upon the detail strip, and platen 255 is the platen which effects the printing upon the check. The platen 254 is operated by the cams 256 and 257 (Figs. 20 and 21), and is carried by the frame 258, which is pivoted upon the shaft 259, upon which shaft arms 260 are loosely carried and the arm 261 rigidly mounted which arms coact respectively with the cams 256 and 257. The arm 260 carries the roll 262 and may be rocked so as to bring the roll 262 into the groove 263 of the cam 256. Then, when the shaft 244 is rotated, the arm 260 will be rocked still further and the edge of the slot 264 in the arm 260 will engage the pin 265, carried by the arm 261, which is rigid upon the shaft 259, and will, therefore, cause the shaft 259 to be rocked causing the platen 254 to carry the detail strip 252 into contact with the type carriers. The cam 257 then effects the return of the arm 261 by engagement with the roller 2645, which is carried by the arm 261 thereby returning the platen 254 to normal position out of contact with the type carriers. The arm 260 is normally held out of the groove of the cam 256 by the spring 2655, but may be moved into the groove of the cam 256 by pushing the arm 266 rearwardly by means of the handle 267, which is provided for this purpose.

With the parts in the position as shown by Fig. 21, the platen 254 would not be operated and, therefore, no impression would be made upon the detail strip if the machine was operated, but if the arm 266 was forced rearwardly to rock the roller 262 into the groove of the cam 256, printing upon the detail strip will take place when the machine is operated. The arm 266 is held in either of its set positions by the spring 268, and the pin 270 which the arm engages at either of the recesses 269. If it is desired to cause impressions to be made upon the detail strip only when the special keys "received on account," "charge," and "paid out" are depressed, the arm 266 is set in the position shown in Fig. 21 and then the disk 271 is rocked to cause the arm 266 to be turned by hand upwardly so the end of the lever 272 will enter the notch 273 in the arm 266. The disk 271 is mounted upon a small shaft which is provided with a knurled head 2715 (Fig. 11), for the purpose of rotating the disk 271. The arm 272 is carried by the sleeve 88, to which the main totalizer throw-out lever 90 is also secured.

If any of the special keys are depressed, the pin 342 (Fig. 22) will engage the surface 274 of the lever 90 and rock the lever into the path of the conical end 91 of the totalizer shaft and also cause the lever 272 to rock rearwardly and carry with it the arm 260, thus forcing the roll 262 into the race of the cam 256 and causing an impression upon the detail strip. By this mechanism cash sales need not be recorded upon the detail strip, while when any special transaction is made, the record of the transaction will be printed upon the detail strip.

The detail strip is fed only when the platen 254 is operated, as the frame 258 which carries the platen 254 also carries the pawls 275 (Fig. 11) which actuate the ratchet 276, which is fixed to the roll 277 upon which the detail strip 252 is wound. The supply roll of detail paper is indicated at 278 and the paper is led from the roll 278 around the platen and then secured to the roll 277.

The supply roll of check paper is indicated at 279 (Fig. 11) and the paper is led downwardly through the guide 280 between the feed rolls 281 and 283 and from there to between the platen 255 and the type carriers, and out through the opening 284 over the movable knife 285. The feed rolls 281 and 283 are geared together by the gears 286 and 287. The gear 286 of the feed roll 281 meshes with a pinion 288 which is journaled upon the shaft 289 and which shaft is normally clutched to the shaft 2905 which carries the pinion 290 (Fig. 18), meshing with the gear 291 which through the pinions 292 and 293 (Figs. 12, 13 and 14), is connected to a drive gear 294 rigid upon the shaft 244. The shaft 289 may be disconnected from the driven shaft 2905 by drawing the shaft 289 outwardly by means of the knurled head 299 and thereby disengaging the shaft 289 at 2955 from the lug 2966 of the shaft 2905. When it is in such position, the shaft 289 will not communicate the motion which the shaft 2905 receives from the drive gear 294 to the feed rolls 281 and 283.

The platen 255 (Fig. 11) will not be operated when the feed rolls 281 and 283 are made inoperative as the platen 255 is actuated by a cam 297 carried by the roll 283, to which the gear 287 is secured. If, by means of the knurled head 299, the shaft 289 is pushed inwardly to bring the cut 2955 into engagement with the lug 2966, feed rolls 281 and 283 and the platen mechanism will be operatively connected to the drive gear 294.

The shaft 289 is provided with a spline at 295 which fits into a cut 296 in the pinion 288 and also co-acts with a cut 2967 in the printer frame, when the shaft 289 is in its outer position, at which time the spline extends both into the cut in the printer frame and the cut in the pinion 288, and thereby prevents accidental rotation of the feed rolls when the check printing mechanism is inoperative.

The type wheels are inked by the ink pads 2515 and 2516 carried by the frame 2517. This frame is oscillated by the rack 2518 to bring the ink pads between the platens and the type carriers a short while before impressions are taken from the type wheels. The cams which operate the two platens are arranged to cause the platens to first move part way toward the type carriers in order to press the ink pads against the type carriers. The platens are then returned and the ink pads moved out of their paths after which the platens are operated to cause the impressions to be made upon the strips of detail and check paper.

The shaft 289 is provided with a pair of annular grooves 300 and 301 which co-act with a spring pressed locking device 302. The shaft 244 carries a small disk 245 (Fig. 19), which is cut away at 246 at the point which comes opposite the locking arm 302 when the shaft 244 is in its normal position with the machine at rest. In this position longitudinal movement of the shaft 289 is possible as the locking arm 302 may be forced out of one of the grooves 300 or 301 in the shaft 289 against the action of its spring 303, but after the machine starts to operate, the circular face of the disk 245 will be opposite the locking arm 302 and, therefore, movement of the arm 302 is prevented when the machine is being operated and will thereby lock the shaft 289 in its set position.

With the shaft 289 in its outer position with the cut 2955 moved away from the lug 2966 of shaft 2905, the check feeding and printing mechanism will be entirely inoperative, and even if the shaft 289 is pushed inwardly to connect it with the shaft 2905, the check printing mechanism may still be made inoperative by moving the pinions 292 and 293 (Figs. 12, 13 and 14) out of mesh with the gears 291 and 294, thereby disconnecting the gear 291 from the drive gear 294. This is accomplished by means of the handle 304 and mechanism operated thereby which is shown in Fig. 12. This figure and Fig. 13 show the pinions 292 and 293 unmeshed from their gears 291 and 294. The pinions are carried by a frame 305 which is pivoted at 306 to the side frame 307 and the frame 305 may be rocked by means of the bar 308 which co-acts with the pin 309 carried by the lever 310, which is pivoted at 311 and actuated by the handle 304.

If the handle is forced inwardly so that the outer one of two notches 312 fits over the pin 313, the frame 305 will be rocked around its pivot 306 to carry the pinions 292 and 293 into mesh with the gears 291 and 294, and, at the same time, out of mesh with the aliner 315, which is integral with the bar 308. This is the normal position of the handle 304 and the check printing is normally controlled by means of the knurled head 299 on the shaft 289, but it is sometimes desirable that a check issue only when a special transaction is recorded. In such case, the shaft 296 is pushed inwardly to connect the same with the shaft 2905 and the handle 304 is set to the position in which it is shown in Fig. 12, and the check feeding and printing device will thereby be disconnected from the driving mechanism at the pinions 292 and 293, but the lever 272 which is actuated by the special keys "Received on account", "Charge", and "Paid out," upon the depression of one of the keys acts upon a pin 316 which is carried by the bar 308 and causes the bar to rock the frame consequently the pinions 292 and 293 into mesh with their respective gears. Toward the completion of an operation of the machine after one of the special keys "Received on account", "Charge" or "Paid out" has been depressed, the frame is rocked again to carry the pinion 292, 293 out of mesh by means of the spring pressed pawl 317, which is carried by disk 321. The pawl 317 is spring pressed in order that it may idly wipe by the projection 3175 of frame 305 when the frame is locked at 313 in the position at which the pinions 392 and 393 mesh with gears 291 and 294. The frame 305 carries the arm 318 which is provided with a pair of notches 319, which fit over a fixed tooth 320 and the arm 318 is locked to the teeth 320 by the hub of the disk 321, carried by the drive shaft 23 during a rotation of said shaft. The hub is cut away at 322 to permit the frame 305 to be rocked only when the drive shaft 23 is in or near its normal position.

Figs 15 and 16 illustrate a locking pawl 321 which prevents accidental rotation of the gear 291 when the machine is at rest in its home position. The driving gear 294 which is connected to the gear 291 through the intermediate pinions 292 and 293 is so formed at 325 (Fig. 13) as to permit the shaft 244 to rotate a certain amount before the gear 291 is rotated and the shaft 244 carries a disk 326 upon which is mounted a pin 327 which co-acts with the arm 328 of the locking pawl 324 to hold the locking pawl in engagement with the gear 291 when the shaft 244 is at rest in its home position, but as soon as the shaft 244 starts to rotate and before the gear 204 starts to rotate the pinion 293, the pin 327 will move away from the arm 328 and permit the locking pawl to be moved out of engagement with the gear 291 under the action of its spring 330.

If the check printing mechanism is disconnected from the driving mechanism by drawing the shaft 289 outwardly, accidental rotation of the check feed rolls is prevented by the lug 295 (Fig. 18) of the shaft 289, which, at such time, extends both into the cut 2967 in the frame of the printer and the cut 296 in the gear 288, and thereby prevents rotation of the shaft 289. If the shaft 289 is in its inner position with the lug 295 disconnected from the printer frame, and if the check printing mechanism is disconnected from the driving mechanism by moving the pinion 293 (Fig. 13) away from the drive gear 294, accidental rotation of the check feed rolls is prevented by the pin 3245, which is carried by the gear 291 (Fig. 12). When the pinion 293 is out of mesh with the gear 294, the pin 3245 fits in a notch in the frame 305 and thereby prevents rotation of the gear 291, which gear is one of the train of gears by which the check feed rolls are driven. If the frame 305 is rocked forwardly to mesh with the pinions 292 and 293 with the gears 291 and 294, the notch in the frame which co-acts with the pin 3245 will be moved away from the pin, thereby permitting the rotation of the gear 291 when the machine is operated.

*Modified indicator setting mechanism.—* Figs. 40, 41, 42 and 43 are views which illustrate a modification and show how the machine would appear with both sets of multiple totalizers removed. In this case the segments 33 instead of being mounted upon the concentric sleeves 96 are merely loosely journaled upon the shaft 95, as the concentric sleeves which communicate the differential movement of the segments to the actuating devices of the multiple totalizers are not needed in this modification. These views also show a substitute arrangement for the units bank of keys, namely, instead of the usual nine keys, one five cent key is substituted, as the remaining keys in the bank are superfluous in some uses to which the machine may be put. The five cent key shown is arranged to set its indicator mechanism for operation directly from its segment 4 instead of through an intermediate segment such as the segments 33, which are controlled by the other banks of keys hereinbefore described.

A single indicator shown in detail in Fig. 41 serves for indicating both at the front and the rear of the machine. It is positioned by means of the following mechanism: A link 361 is pivoted to the side of the indicator 362 and at its lower end is pivoted to a lever 363 fast upon the shaft 364. The shaft 364 has pinned thereto a collar 365 provided with a lug 366 which fits in a cut away part 367 of the collar of a lever 368. The cut away part 367 of the lever 368 is wider than the lug 366 to permit a certain amount of independent movement of the lever 368 with respect to the shaft 364. The lever 368 may be rocked by means of the segment 4, which is actuated by the five cent key and connected to the lever 368 by a link 369. Depression of the five cent key will cause the lever 368 to be rocked only slightly upon the shaft 364, but enough to bring a pin 370 which is carried by the lever 368 into the groove 371 of a cam 372. The cam 372 is rigidly secured to the rotation shaft 244 and when this shaft 244 rotates upon an operation of the crank handle 87, the cam will draw the lever 368 still farther inwardly and cause the collar of said lever to engage the lug 366 of collar 365 and rock the shaft 364. As the lever 363 is rigid upon the shaft 364, it will then pull downwardly upon the link 361 and move the indicator from its zero indicating postion to its five cent indicating position. The shaft 364 has rigidly mounted thereon an arm 410, upon which a locking pawl 411 normally rests which pawl is pivoted upon the side frame of the machine and when the shaft 364 is rocked to set the indicator to the "five" position, this locking pawl drops over the arm 410 and retains it in its moved position, thereby locking the indicator in its moved position. Continued rotation of the cam 372 forces the arm 368 back to its normal position, the lost motion connection with the shaft 364 permitting its relative movement with respect to the shaft.

The shaft 364 is provided with a coiled spring 413 which tends normally to hold the shaft in such position that the "zero" of the indicator will be in view and if the indicator is set in the "five" position, then at the beginning of the next operation of the machine, the cam 412 will engage an antifriction roller carried by the locking pawl away from the arm 410 thereby to permit the shaft 364 to return to its initial position under the action of the coiled spring, "413" at the same time causing the indicator to be returned to zero. If the machine is operated without first depressing the five cent key, the roll 370 of the arm 368 will remain at the outside of the cam 372 and the indicator will, therefore, be held in its zero position.

The type carrier which is controlled by the five cent key is indicated at 409, (Fig. 43). It is moved from zero to five or from five to zero with the indicator by the link 407 (Fig. 40) which connects the lever 410 with a crank 408 rigidly mounted on the shaft 3875 upon which the type carrier 409 is mounted.

*Operation.*—If a cash sale is to be recorded by the machine, the clerk having the transaction in charge will depress the desired amount keys 1, his initial key 2, and then twice rotate crank 400. The depression of the amount keys will, through the segments 4, rotate the pinions 17 extents which correspond to the value of the keys depressed. The depression of the initial key unlocks the machine by causing the pin 3435 (Fig. 22), carried by the segment 4, operated by the initial bank to engage and rock the arm 343 and consequently shaft 341 to an extent sufficient to carry the locking pawl 352 (Fig. 9) away from the pin 353 on the drive gear 123. The depression of the clerk's initial key also sets the rack 216 (Fig. 33) in such position that upon the return of the segment 4, the rack 216 will rotate the pinion 217 carried by the shaft 157, so that upon the operation of the machine when the crank handle 400 is rotated, the cam 221 which is carried by the shaft 157 will raise the slide 223 the proper extent to bring the desired one of the shoulders 230 of the bars 225 in the path of the shoulder 228 of lever 229 (Fig. 31) so that, when the lever 229 is rocked, the desired one of the clerks' totalizers will be moved into mesh with the actuating racks 100 (Fig. 29) and the drawer selecting device will also be properly set. When the bar 238 (Fig. 36) is raised by the arm 243, carried by the shaft 244, the particular beam 236 which has been selected will be rocked to raise its link 239 thereby to release the selected drawer.

The drawer selecting mechanism and clerks' totalizer selecting mechanism is, of course, not operated until after the crank 400 starts to rotate, and simultaneously with the setting of the selecting mechanism, the broad pinions 26 are thrown into mesh with the sets of pinions 17, 29 and 30. The shaft 19 which carries the pinions 17, 29 and 30 is then rocked by the segment gear 24 by means of the cam 22 (Figs. 24 and 25), thus causing the short arms 20, carried by the shaft 19 to engage the pins 18, carried by the pinions 17 and thereby return the pinions 17 to their zero positions. The return of the pinions 17 to their zero positions causes the pinions 29 and 30 to be rotated similar amounts as the broad pinions 26 connect all three of these pinions. The pinions 30, which mesh with the totalizer pinions by this means rotate the totalizer pinions according to the initial setting of the pinions 17, and the pinions 29 which mesh with the segments 33 rotate the segments 33 the desired amounts.

If any of the transfer pawls 83 (Fig. 4^A) have been tripped when the amount is added to the totalizer, such pawls will rotate their corresponding pinions one tooth space when moved forwardly by the cams 835. The setting of the segment 33 causes the beams 41 (Fig. 4) to be rocked around their pivots 42 according to the amount of rotation of the segment 33. The shaft 69 is then rocked to lock the segments in their moved positions and the cams 46 and 47 then act upon the rollers 48 and 49 of the slides 43 to bring the slides back to their neutral positions and thus rock the beams 41 from their pivots 40, which movement through the medium of links 51, arms 52 and segments 53, serves to set the amount indicators. The alining pawls 56 are then moved into engagement with the alining disks 57, to lock the indicators in their set positions. The rotation of the segments 33 causes the pinions 35 to be correspondingly rotated and as these pinions are fixed on the sleeves 387 (Fig. 4) which carry on their outer ends the amount type wheels 251, the type wheels will be set to correspond with the amount which was set upon the key board. The depression of a special key similarly sets the type wheel 36, likewise the depression of an initial key sets the type wheels 37. The platens 254 and 255 (Fig. 11) are then actuated to cause the impressions to be made on the detail strip and the check strip, provided the shaft 289 (Fig. 18) has not been set by means of the milled head 299 to prevent the operation of the check issuing mechanism or neither of the handles 267 and 304 (Figs. 12, 20 and 21) have been set to prevent impressions on either the check or the detail strip. If the shaft 289 (Fig. 18) has been set by means of the knurled head 299 so that the lug 2966 of the driven shaft 2905 is out of the cut 2955 in the shaft 289, the check feeding mechanism and platen 255 (Fig. 11) will be as hereinbefore described entirely inoperative as the platen is actuated by a cam 297 carried by the feed roll 283, which is geared by the gears 287 and 286 and pinion 288 to the shaft 289. If the shaft is positioned to make this mechanism operative, the mechanism may still be disconnected from the main driving mechanism by means of the handle 304 which is drawn outwardly to the position shown in Fig. 12, which will disconnect the pinions 292 and 293 from the gears 291 and 294. If the "received on account", "charge", or "paid out" key is then depressed, the lever 272 will be rocked to engage the pin 316 carried by the bar 308 and cause the frame 305 to be rocked so that the pinions 292 and 293 will be meshed with the gears 291 and 294, and a check will issue upon the operation of the machine.

The platen for the detail strip and the feeding mechanism of the detail strip depend upon the setting of the handle 267 for operation. If the handle 267 is in the position shown in Fig. 21, the platen will not operate, but if it is pushed inwardly either by hand or by means of the lever 272, which is actuated by the "received on account,"

"charge" or "paid out" keys, the roll 262 will be brought into the race of the cam 263 and then when the shaft 244 is rotated the platen carrying frame 258 will be rocked downwardly, pressing the detail strip against the type carriers. The clerks' indicators are set in the same manner as the amount indicators. The special indicator is set either directly by means of the segment 33 of the special bank or by means of the cam 121 (Fig. 17), depending upon the position of the pivot 115 when the segment 33 is actuated. If the pivot 115 is in the position shown in Fig. 17, when the segment 33 is rotated the beam 108 will rock from the pivot 124, thus pulling downwardly on the link 107, and thereby rotating the small segment 104 (Fig. 4), which actuates the special indicator. If the pivot 115 is in a lower position, before the segment 33 is operated, the segment will merely lift the roll 119 more or less out of the path of the cam 121 and the indicator will be set by the action of the cam 121 upon the roll 119. In this case the link 107 will be raised as the beam will, then swing from the pivot pin 118.

If the "received on account," "charge," or "paid out" key is depressed, the main totalizer will not be operated, but one of the special totalizers shown in Fig. 29 will be rocked into mesh with the actuating racks 162 by means of the slide 145 (Fig. 31) which is raised or lowered according to the rotation of the special indicator which carries the pinion which meshes with the rack 143 of the slide and the slide after being set in the vertical direction is then rocked rearwardly by the bell crank lever 156, which is actuated by the cam 158 (Fig. 32ᴬ) on the rotating shaft 159. When the slide 145 is rocked rearwardly one of the pins 146 carried thereby will engage one of the links 148, 165 or 168 and rock the same rearwardly, and thereby rock the desired special totalizer into mesh with the actuating racks 162 (Fig. 29) as the links 148, 165 and 168 are pivoted to the levers 151 which are carried by the shafts 152 upon which the special totalizer frames 153 are carried.

The amount segments 33 are carried by the sleeves 96 which also carry the segments 98 by means of which the racks 162 for operating the special totalizer and the racks 100 for the clerks' totalizers (Fig. 29) are set. When the segments 33 are rocked forwardly the broad pinions 178 connect the segments 98 with the segments 97. The segments 97 mesh with the racks 100 and also with the gears 179 and these are connected through the broad pinions 184 with the gears 183, which mesh with the racks 162. Therefore, both sets of racks 162 and 100 will be set when the segments 33 are rocked forwardly. The broad pinions 178 are then thrown out of mesh, at which time the desired totalizers are moved into mesh with the racks 162 and 100. The shaft 180 is then rotated by means of the segment 1845, which meshes with a pinion 1835 on the shaft 180 (Fig. 31), and is actuated by a cam 186 on the shaft 23, which cam causes the segment 1845 to rotate the shaft 180 opposite to the direction indicated by the arrow 185 (Fig. 29), and the groove 182 in the shaft 180 will engage the pawls 181 and through them return the gears 179 to their original positions, and as the broad pinions 184 are still in mesh with the gears 179 and 183, the return movement of the gears will be communicated to the gears 183 and through them to the racks 162 and through the segments 97 to the racks 100 and thereby cause the racks to add the amount which has been set up on the key board to the desired special totalizer and the desired clerks' totalizer.

If any of the cams 191 (Fig. 30) of either of the special totalizers or the clerks' totalizers rock the slides 188 or 205 backwardly such slides will, through the pins 189, carried by the slides, cause the levers 190 of the actuating racks of next higher order to be rocked backwardly and so permit the racks to move upwardly an extra unit of movement for the purpose of rotating their totalizer pinions the extra unit, thus turning in the transfer. The extra unit of movement of the racks is accomplished by the levers 193 and 199 which levers are actuated by cams 194 and 200, carried by the rotating shafts 201 and 159. At the time the transfer is effected, the broad pinions 184 are out of mesh with the gears 179 and 183 permitting the two sets of racks 162 and 100, at such time, to move independently of each other. The operation has been described merely in this general way without reference to the minor mechanical features, as a complete description of the operation of all these details may be found in the body of the specification.

While the form of mechanism herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:

1. In an accounting device, the combination with a plurality of totalizers, of a single actuating means common to all of said totalizers, means for establishing a coöperative relation between said actuating means and any one of the totalizers, said means comprising a series of operating connections one for each totalizer, a main operating device common to and operating all of said operating connections, a series of keys and means differentially controlled thereby for establishing a coöperative relation between said main operating device and any one of said operating connections.

2. In an accounting device, the combination with a plurality of totalizers, of a single actuating means common to all of said totalizers, means for establishing a coöperative relation between said actuating means and any one of the totalizers, said means comprising a series of operating connections one for each totalizer, a main operating device common to and operating all of said operating connections, manipulative means, and means differentially controlled thereby for establishing a coöperative relation between said main operating device and any one of said operating connections.

3. In an accounting device, the combination with a plurality of cash receptacles, of a plurality of latching devices, one for each receptacle each including a latch and each including a member always connected thereto operated at each operation of the machine, an actuating device having a constant movement at each operation of the machine and operatively connected to all of said members, a series of keys, and means differentially controlled thereby for rendering one of said members effective to release its appropriate latch at an operation of the actuating device.

4. In an accounting device, the combination with a plurality of cash receptacles, of a plurality of latching devices, one for each receptacle, each including a latch and each including a member always connected thereto operated at each operation of the machine, an actuating device having a constant movement at each operation of the machine and operatively connected to all of said members, manipulative means, and means differentially controlled thereby for rendering one of said members effective to release its appropiate latch at an operation of the actuating device.

5. In an accounting device, the combination with a totalizer, of means for differentially actuating the same, manipulative means for determining the extent of such differential actuation, a main actuator for restoring said actuating means to normal position, devices for establishing a coöperative relation between said totalizer and its actuating means during the return movement of the latter, an obstructing device carried by the actuating means for limiting its return movement, an auxiliary actuator, and means actuated by the totalizer for simultaneously disabling said obstructing means and establishing a coöperative relation between said actuating means and auxiliary actuator whereby to give an extra degree of motion to said actuating means and the totalizer.

6. In an accounting device, the combination with a plurality of totalizers, of a single means common to all of said totalizers for differentially actuating the same, manipulative means for determining the extent of such differential actuation, a main actuator for restoring said actuating means to normal position, devices for establishing a coöperative relation between said actuating means and any one of said totalizers during the return movement of the former, an obstructing device carried by the actuating means for limiting its return movement, an auxiliary actuator and means actuated by the selected totalizer for simultaneously disabling said obstructing means and establishing a coöperative relation between said actuating means and auxiliary actuator, whereby to give an extra degree of movement to said actuating means and selected actuator.

7. In an accounting machine, the combination with printing mechanism including a platen and type carrying elements, of a plurality of registering devices each designed to receive entries of a certain class, means for differentially setting the type carrying elements and operating the registering mechanism accordingly, operating mechanism which normally causes the operation of the platen after each setting of the type carrying elements, manipulative means which may be operated to prevent the operation of the platen except when transactions are entered in the aforesaid registering devices, and separate manipulative means which may be operated to prevent the operation of the platen regardless of any operation of the first mentioned manipulative means.

8. In a machine of the class described, the combination with a printing mechanism and a platen for taking impressions therefrom on a record strip, of a box cam having a groove for driving said platen, a movable device for connecting said platen to be driven by said cam and normally out of range of said groove, a manipulative means for moving said connecting device into position to be engaged by said groove and be further moved thereby at an operation of said cam.

9. In a machine of the class described, the combination with a printing mechanism and a platen for taking impressions from same, of a box cam, a pivoted arm connected to said platen and having means for engaging the race of said cam, but normally disconnected therefrom, and manipulative means for moving said pivoted arm to be engaged and further moved by the race of said cam.

10. In a machine of the class described, the combination with a printing mechanism, and a platen for taking impressions therefrom, of a cam for driving said platen, a movable device connected to said platen and constructed to be normally out of range of action of said cam, and manipulative and automatic means each constructed to move said movable device into position to be engaged and further operated by said cam.

11. In a machine of the class described, the combination with a printing mechanism, and a platen for taking impressions therefrom, of a box cam, a pivoted arm connected to said platen and having a device to engage the race of said cam, but normally disconnected therefrom, and manipulative means and automatic devices each constructed to move said pivoted arm into position to be engaged and further operated by the race of said cam.

12. In a machine of the class described, the combination with a printing mechanism, and a platen for taking impressions therefrom, of a cam for driving said platen, an actuating device connected to said platen and constructed to be acted on by said cam but normally disconnected therefrom, a link connected to said actuating device for moving the same into connection with said cam, a manipulative device for manually adjusting said link.

13. In an accounting machine, the combination with a registering device, of a plurality of gears mounted in axial alinement, one of said gears operatively connected to the registering device, and means for automatically adjusting said link at certain operations of the machine, means for differentially rotating another of the gears, a pivoted support having a broad pinion journaled thereon, means for rocking the pivoted support to carry the broad pinion into and out of mesh with all of the gears, thus operatively connecting or disconnecting the gears, and a member for causing the support and broad pinions to be cammed in an axial direction when they are carried toward the gears and thereby not permit the broad pinion to mesh with all of the gears.

14. In an accounting machine, the combination with a registering device, of a plurality of gears mounted in axial alinement, one of said gears operatively connected to the registering device, means for differentially rotating another of the gears, a pivoted support having a broad pinion journaled thereon, means for rocking the pivoted support to carry the broad pinion into and out of mesh with all of the gears, thus operatively connecting or disconnecting the gears, a member for causing the support and broad pinion to be cammed in an axial direction when they are carried toward the gears and thereby not permit the broad pinion to mesh with all of the gears, and means operating so that when the broad pinion has been shifted in an axial direction when being meshed with the gears that upon the return of the broad pinion, the broad pinion will be again shifted in an axial direction to its normal position.

15. In an accounting machine, the combination with a registering mechanism, of a pair of gears loosely journaled upon a common shaft, means for differentially rotating one of the gears, an arm rigidly mounted upon the shaft to rotate therewith, a lug on each of the gears arranged for co-acting with the arm, a broad pinion arranged to mesh with the pair of gears when the one gear has been rotated the desired distance from its zero position, means for rotating the shaft after the broad pinion has been meshed with the pair of pinions so that the arm carried thereby will engage the lug of the moved gear and return the gear to its zero position, and thereby through means of the intermediate broad pinion rotate the companion gear according, and said companion gear comprised in the registering mechanism as a denominational element.

16. In a machine of the class described, the combination with a set of three gears, co-axially alined and a supporting shaft on which said gears are loosely mounted, of means for differentially positioning one of said gears, a pinion for connecting all said gears, an arm fast on said shaft, and a projection on said differentially positioned gears which said arm may engage and operate.

17. In a machine of the class described, the combination with a gear, and means for differentially positioning it, of two additional gears, a pinion positioned to connect all three of said gears, a shaft on which said first gear is mounted and an arm fast thereto, and a projection on said first gear which is engaged and operated by said arm.

18. In a machine of the class described, the combination with a gear, and a differentially operable driving device for the same, an additional gear, and a pinion for connecting said two gears, projection on said first gear, a pivoted arm positioned to engage said projection and thereby operate said gear, and a totalizer driven by said additional gear.

19. In a machine of the class described, the combination with a gear and a differentially operable driving device for the same, an additional gear, a pinion for connecting said two gears, projections on each of said gears, an oscillating arm constructed to engage the projections on said gears alternately during movement of said arm in opposite directions, and a type carrier controlled by said additional gear.

20. In a machine of the class described, the combination with a plurality of cash receptacles and latching devices therefor, of links for releasing said latches, levers connected to said links, a bar pivoted to all said levers at points near the centers of said levers, means for moving said bar, and devices for obstructing the ends of said levers distant from said links with hand controlled means for operating said obstructing devices.

21. In a machine of the class described, the combination with a plurality of cash receptacles, and latching devices therefor, of levers for actuating said latches, a moving device connected to all said levers, and hand controlled devices for obstructing said levers.

22. In a machine of the class described, the combination with a plurality of cash receptacles and latching devices therefor, of levers connected at corresponding ends to said latching devices, a bar connected to all said levers at approximately the centers thereof, and hand controlled means for obstructing the other ends of said levers.

23. In a machine of the class described, the combination with a plurality of cash receptacles, and latching devices therefor, of levers connected at corresponding ends to said latching devices, means for giving equal movements to a point of each of said levers at or near the centers thereof, devices for obstructing the other ends of said levers, and keys controlling the movement of said obstructing devices.

24. In a cash register, the combination with registering mechanism, of a plurality of cash drawers, a drawer latch for each of the drawers, pivoted bars for lifting the drawer latches to release the drawers, means for rocking all of said bars upon each operation of the machine, and means for causing only a desired one of said bars to lift its respective drawer latch when the bars are rocked.

25. In an accounting machine, the combination with registering mechanism, of means for differentially operating the same, driving mechanism for said means, a machine lock co-acting with the driving mechanism, a depressible key arranged to cause the machine lock to release the driving mechanism when the key is depressed, means for releasing the key while the machine is being operated so the machine lock will be moved into position for stopping the driving mechanism when it reaches its home position, means operated by the machine for recording each depression of said key, and means for causing the machine lock to prevent operation of the machine if the key is released before a record of its depression is made.

26. In a machine of the class described, the combination with a series of keys, and an element differentially set thereby, of a cam differentially positioned by said element, a series of slides moved by said cam, a common actuating device for said slides, a series of cash receptacles having latching devices, and connections whereby said slides may, when moved by said common actuating device, control said latching devices.

27. In a machine of the class described, the combination with a series of cash receptacles having latching devices, a series of slides one for each cash receptacle, an actuating device for moving the slides longitudinally, a differentially movable member for adjusting the slides to bring either of them into operative relation with the actuating device, means for adjusting the differentially movable member, and a series of connections for releasing their corresponding latching device, controlled by the longitudinally moved slide.

28. In a machine of the class described, the combination with a plurality of cash receptacles having latching devices, and a corresponding number of totalizers, of operating means common to said totalizers, a series of slides connected to cause engagement of said totalizers and said operating means, a series of levers connected to and actuating said latching devices, a series of keys, and means controlled by said keys for moving said slides to position such that they may obstruct said levers, and cause engagement of said totalizers and their operating means.

29. In a machine of the class described, the combination with a plurality of cash receptacles having latching devices, and a corresponding number of totalizers, of operating devices common to said totalizers, a series of slides connected to cause engagement of said totalizers and said operating devices, key controlled devices for adjusting said slides differentially, actuating means for said latching devices, and means for longitudinally moving said slides after they have been adjusted, into a position such that they obstruct said latching device actuating means and cause engagement of said totalizers with their operating devices.

30. In an accounting machine, the combination with a plurality of totalizers, of operating mechanism for the totalizers, a plurality of cash drawers, selecting mechanism for causing any particular totalizer to be operatively connected to the operating mechanism and a certain corresponding cash drawer to be opened, and means for opening any desired cash drawer without causing its corresponding totalizer to be operatively connected with the operating mechanism.

31. In a machine of the class described, the combination with operating racks and a plurality of totalizers, of a bar mounted both to slide and rotate around a point, keys for controlling the extent of the sliding movement, automatic means for rocking the slide around said point, and separate devices for connecting said totalizer to be moved into engagement with said operating racks by the rocking movement of said slide.

32. In a machine of the class described, the combination with operating racks, of a plurality of movable frames and totalizers carried by said frames, a determining bar, and a pivot for said bar, a set of keys, means controlled by said keys for differentially sliding said bar, devices for connecting said bar separately to said totalizer frames, and automatic means for rocking said bar around its pivot, and thereby engaging desired totalizers with said operating racks.

33. In a machine of the class described, the combination with operating racks, of a plurality of totalizers, a determining bar, a set of keys, and means controlled by said keys for giving said determining bar differential movements in one direction, automatic means for giving said bar invariable movements in another direction, and elements connected to said totalizers and positioned to be selectively operated by the invariable movement of said determining bar, and thereby to draw desired totalizers into mesh with said operating racks.

34. In a machine of the class described, the combination with operating racks, and a plurality of totalizers normally disengaged from said racks, a set of keys, a determining bar, and means controlled by said keys for giving differential movements to said bar, slides carried by said bar and having connections to said totalizers, and automatic means selectively engaging and moving said slides to carry the desired totalizer into mesh with the operating racks.

35. In a machine of the class described, the combination with two sets of totalizers and two sets of operating racks therefor, of common actuating devices for said sets of racks, with means for giving said actuating devices differential movements, displaceable connections between said sets of racks and the common actuating devices, separate transfer mechanisms for giving the sets of racks excess transferring movements, and means for withdrawing said displaceable connections while said transferring movements are given said transfer mechanisms.

36. In a machine of the class described, the combination with independent sets of totalizers, independent sets of operating racks therefor, and common actuating means for said racks, of pinions connecting said actuating devices to said racks, separate means for independently giving said racks excess transferring movements, and devices for displacing said pinions during said excess movements of said racks.

37. In a machine of the class described, the combination with an accounting device, of means for moving same to effect a record, said means comprising a pivoted rocking plate, a pin on said plate, a cam and a groove in said cam capable of coöperation with said pin to rock said plate and move said accounting device; a series of special keys and means controlled thereby for so positioning said plate with relation to the cam as to prevent coöperative relation between said groove and pin.

38. In a machine of the class described, the combination with a plurality of sets of totalizers, of operative mechanism for said sets of totalizers, a plurality of cash drawers, selecting mechanism for causing any particular totalizer of one set to be operatively connected to the operating mechanism and a certain corresponding cash drawer to be opened, manipulative devices and selective mechanism controlled thereby for connecting either of the totalizers of the other set to the operating mechanism, and means controlled by the connecting of certain of the totalizers of said other set with the operating mechanism for preventing operative connection between any of the totalizers of the one set with their actuating mechanism yet permitting opening of a cash drawer corresponding to one of the totalizers of said last mentioned set.

39. In a machine of the class described, the combination with a series of cash drawers, a series of latching devices therefor, a series of releasing mechanisms for releasing the latches one for each latch, common operating means for the releasing mechanisms, means operatively connected through the releasing devices to all of the latches, an adjustable member, and means controlled thereby for selecting a cash drawer to be opened and rendering the operation of its corresponding releasing mechanism effective to release said drawer.

40. In a machine of the class described, the combination with a series of cash drawers, a series of latching devices therefor one for each drawer, means operatively connected at all times with all of the latches for releasing the latches, manipulative devices, and means controlled thereby for selecting the cash drawer to be opened and rendering the releasing means effective to release the latch for the selected drawer.

41. In a machine of the class described, the combination with registering mechanism, of means for differentially operating the same, driving mechanism for said means, a machine lock coacting with the driving mechanism, a depressible key arranged to cause the machine lock to release the driving mechanism when the key is depressed, means operated by the machine for recording the depression of said key, and means for preventing operation of the machine if the key is released before a record of the depression is made.

42. In a machine of the class described, the combination with a totalizer comprising a plurality of totalizer elements, of means for differentially actuating the same, a main actuator for restoring said actuating means to normal position, means for establishing coöperative relation between the totalizer and its actuating means before the return movement of the latter, a set of obstructing devices carried by the elements of the actuating means for limiting their return movement, means controlled by the totalizer elements for rendering the obstructing device of the actuating means for the next higher totalizer element ineffective, and means for moving said actuating means for the next higher element and its connected element an additional step to effect the transfer.

43. In a machine of the class described, the combination with a plurality of totalizers, of a set of actuators for each totalizer, means connecting the actuators for all of the totalizers, driving mechanism for the connected actuators, means for disabling the connecting means for the actuators for the purpose of permitting independent movement of the different sets of actuators for effecting transfers.

44. In a machine of the class described, the combination with a plurality of totalizers, of a set of actuators for each totalizer, means for connecting and simultaneously operating the different sets of actuators for the purpose of entering an item upon the totalizers, and means for disconnecting the different sets of actuators and imparting an independent movement to any actuator of any set for the purpose of effecting a transfer.

45. In a machine of the class described, the combination with a plurality of totalizers, of a set of actuators for each totalizer, means for connecting and simultaneously operating the different sets of actuators for the purpose of entering an item upon the totalizers, means for disconnecting the different sets of actuators, and means for imparting an additional movement to the actuators of any set while said actuators are disconnected for the purpose of effecting a transfer.

46. In a machine of the class described, the combination with a plurality of totalizers, of a set of actuators for each totalizer, means for connecting and simultaneously operating the different sets of actuators for the purpose of entering an item upon the totalizers, and means for disconnecting the sets of actuators and positively imparting an independent movement to any actuator of any set for the purpose of effecting a transfer.

47. In a machine of the class described, the combination with a plurality of totalizers, of a set of actuators for each totalizer, means for connecting and simultaneously operating the different sets of actuators for the purpose of entering an item upon the totalizers, normally inoperative means for imparting an additional movement to the actuators of any set for the purpose of effecting a transfer, means controlled by any totalizer for rendering operative the last mentioned means relative to the totalizer's companion set of actuators, and means for disconnecting the various sets of actuators when a transfer is to be effected.

48. In a machine of the class described, the combination with a plurality of totalizers, of a set of actuating racks for each totalizer, means for connecting and simultaneously operating the different sets of racks for the purpose of entering an item upon the totalizers, normally inoperative devices carried by the racks of each set for causing an additional movement to be imparted thereto for the purpose of effecting a transfer, and means for disconnecting the various sets of actuating racks when a transfer is to be effected.

49. In a machine of the class described, the combination with a plurality of totalizers, of a set of actuating racks for each totalizer, means for connecting and simultaneously operating the different sets of actuating racks for the purpose of entering an item upon the totalizers, adjustable devices carried by the racks of each set, means for independently imparting through the adjustable devices an additional movement to the actuating racks of each set for the purpose of effecting a transfer, and means for disconnecting the various sets of racks when a transfer is to be effected.

50. In a machine of the class described, the combination with a plurality of totalizers, of a set of actuating racks for each totalizer, pinions connecting the various sets of racks so as to permit the simultaneous movement of said rack sets, means for independently imparting an additional movement to the actuating racks of each set for the purpose of effecting a transfer, and means for withdrawing the pinions and thereby disconnecting the various sets of racks when a transfer is to be effected.

51. In an accounting machine, the combination with printing mechanism comprising a platen, of registering mechanism in which items of different classes may be registered, a plurality of manipulative devices for determining the classification of items in the registering devices, operating mechanism normally causing an operation of the platen each time a transaction is registered, manipulative devices whereby said operating mechanism may be brought under the control of the aforesaid determining devices thereby causing the operation of said platen only when one of said determining devices is operated, and separate manipulative devices adjustable to disable the platen operating mechanism regardless of the nature of the transaction.

52. In an accounting machine, the combination with a main driving mechanism, of a printing mechanism comprising a platen, operating devices normally causing the operation of the platen on each operation of the main operating mechanism, a plurality of registering devices each designed to receive entries of a certain class, manipulative means for selecting the registering device in which an item is to be entered, an adjustable device whereby said platen operating devices may be brought under the control of said selecting means to cause the operation of the platen only when the selecting means is operated, and separate manipulative devices adjustable to disable the platen operating mechanism on all operations of the main driving mechanism.

53. In an accounting machine, the combination with a main driving mechanism, of a printing mechanism comprising paper feeding devices normally feeding on every operation of the main driving mechanism, a plurality of registering devices each designed to receive entries of a certain class, manipulative means for selecting the registering device in which an item is to be entered, an adjustable device whereby said paper feeding devices may be brought under the control of said manipulative selecting means, thereby causing the paper to be fed only when the selecting means is operated, and separate manipulative devices adjustable to disable the paper feeding devices on all operations of the main driving mechanism.

54. In an accounting machine, the combination with operating devices, of a plurality of totalizers each designed to receive entries of a certain class, recording mechanism normally making a record each time the operating devices are operated, manipulative means for selecting the totalizer in which an item is to be entered, adjustable devices for causing the recording mechanism to make a record only when one of said selecting devices is used, and separate devices adjustable to wholly disable said recording devices.

55. In an accounting machine, the combination with a plurality of sets of totalizers, of a set of actuators for each set of totalizers, means normally connecting all of said actuators to a common differential mechanism, means controlled by any totalizer of a group for rendering the actuators of that group effective to make a transfer, and means for disconnecting the various sets of actuators to permit the transfer.

56. In an accounting machine the combination with a main operating mechanism, of a plurality of cash receptacles and latching devices therefor, an element having an invariable movement on all operations of the main operating mechanism, latch tripping devices carried by said invariably moved element and all connected at all times to their latches, and means whereby any desired tripping device may be caused to release its cash drawer on an operation of the invariably moved element.

57. In an accounting machine, the combination with a plurality of cash drawers, of a plurality of latch releasing devices, one connected to each latch, an invariably moved member imparting movement to all of said latch releasing devices at the same time, and manipulatively controlled means for rendering any desired latch releasing device effective to release its drawer.

In testimony whereof I affix my signature in the presence of two witnesses.

THOMAS CARROLL.

Witnesses:
F. E. HAMILTON,
E. J. WITCHGER.

---

Copies of this patent may be obtained for five cents each, by addressing the "Commissioner of Patents, Washington, D. C."

It is hereby certified that in Letters Patent No. 1,108,968, granted September 1, 1914, upon the application of Thomas Carroll, of Oakwood, Ohio, for an improvement in "Cash-Registers,' errors appear in the printed specification requiring correction as follows: Page 7, line 55, for the reference-numeral "875" read *837;* page 15, line 128, for the reference-numeral "204" read *294;* page 18, line 26, strike out the word "pin"; page 19, line 36, strike out the comma after the word "receptacle"; page 20, line 26, strike out the period and insert a comma and the words *and means for automatically adjusting said link at certain operations of the machine.;* same page, lines 31–33, strike out the words "and means for automatically adjusting said link at certain operations of the machine"; same page, line 109, before the word "projection" insert the article *a;* and that the said Letters Patent should be read with these corrections therein that the same may conform to the record of the case in the Patent Office.

Signed and sealed this 13th day of October, A. D., 1914.

[SEAL.]

J. T. NEWTON,

*Acting Commissioner of Patents.*